US012795683B2

(12) United States Patent
Zhang et al.

(10) Patent No.: US 12,795,683 B2
(45) Date of Patent: Nov. 10, 2026

(54) APPARATUS AND METHODS FOR DOWNLINK CONTROL SIGNALING IN WIRELESS NETWORKS

(71) Applicant: HUAWEI TECHNOLOGIES CO., LTD., Shenzhen (CN)

(72) Inventors: Liqing Zhang, Kanata (CA); Jianglei Ma, Kanata (CA); Yongxia Lyu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 510 days.

(21) Appl. No.: 18/335,407

(22) Filed: Jun. 15, 2023

(65) Prior Publication Data

US 2023/0328751 A1 Oct. 12, 2023

Related U.S. Application Data

(63) Continuation of application No. PCT/CN2020/138878, filed on Dec. 24, 2020.

(51) Int. Cl.
*H04W 72/232* (2023.01)
*H04L 25/02* (2006.01)
*H04W 72/231* (2023.01)

(52) U.S. Cl.
CPC ....... *H04W 72/231* (2023.01); *H04L 25/0238* (2013.01)

(58) Field of Classification Search
None
See application file for complete search history.

(56) References Cited

U.S. PATENT DOCUMENTS

| | | | | |
|---|---|---|---|---|
| 9,686,783 | B1 * | 6/2017 | Patel | H04L 5/0053 |
| 12,256,387 | B2 * | 3/2025 | Bagheri | H04W 72/20 |
| 2019/0075524 | A1 * | 3/2019 | Zhou | H04W 72/20 |
| 2019/0132861 | A1 * | 5/2019 | Koorapaty | H04L 1/1854 |
| 2019/0313400 | A1 * | 10/2019 | Farag | H04L 1/1896 |
| 2020/0007295 | A1 * | 1/2020 | Kwak | H04L 5/0053 |
| 2021/0006376 | A1 * | 1/2021 | Cirik | H04L 1/1861 |
| 2021/0037506 | A1 * | 2/2021 | Yoshimura | H04L 5/0091 |

(Continued)

FOREIGN PATENT DOCUMENTS

| | | | |
|---|---|---|---|
| CN | 110972319 | A | 4/2020 |
| EP | 3614756 | A1 | 2/2020 |

(Continued)

OTHER PUBLICATIONS

CATT; "PDCCH monitoring adaptation"; 3rd Generation Partnership Project; 3GPP TSG RAN WG1 #103-e; R1-2007870; Nov. 13, 2020; 8 pages.

(Continued)

*Primary Examiner* — Duc T Duong
(74) *Attorney, Agent, or Firm* — Slater Matsil, LLP

(57) ABSTRACT

A two stage DCI (downlink control information) scheme is provided in which a first DCI is transmitted by a network device in a first physical downlink control channel (PDCCH), and the first DCI including at least one field indicating presence information of a second DCI in a second PDCCH. A user equipment receives the first DCI using blind detection, and using the presence information, can also obtain the second DCI without needing to perform further blind detection.

20 Claims, 9 Drawing Sheets

(56) References Cited

U.S. PATENT DOCUMENTS

| | | | | |
|---|---|---|---|---|
| 2021/0105705 | A1* | 4/2021 | Dimou | H04L 5/0053 |
| 2021/0105752 | A1* | 4/2021 | Taherzadeh Boroujeni | H04W 72/23 |
| 2021/0195559 | A1* | 6/2021 | Khoshnevisan | H04L 1/0038 |
| 2021/0337525 | A1* | 10/2021 | Rahman | H04L 5/0094 |
| 2021/0392625 | A1* | 12/2021 | Lin | H04W 72/23 |
| 2022/0104245 | A1* | 3/2022 | Xu | H04L 5/0053 |
| 2022/0159659 | A1* | 5/2022 | Hosseini | H04W 24/08 |
| 2023/0076897 | A1* | 3/2023 | Svedman | H04L 5/0053 |
| 2023/0164672 | A1* | 5/2023 | Ren | H04W 48/12<br>370/329 |

FOREIGN PATENT DOCUMENTS

| | | | |
|---|---|---|---|
| WO | 2017192224 | A1 | 11/2017 |
| WO | 2019217717 | A1 | 11/2019 |
| WO | 2020018712 | A2 | 1/2020 |

OTHER PUBLICATIONS

LG Electronics; "Discussion on DCI-based power saving adaptation during DRX Active Time"; 3rd Generation Partnership Project; 3GPP TSG RAN WG1 #103-e; R1-2008055; Nov. 13, 2020; 4 pages.

"Physical channels and modulation", 3rd Generation Partnership Project; Technical Specification Group Radio Access Network; NR; (Release 15), 3GPP TS 38.211 V15.9.0; Jun. 2021, 10 pages.

* cited by examiner

APPARATUS AND METHODS FOR DOWNLINK CONTROL SIGNALING IN WIRELESS NETWORKS

CROSS-REFERENCE TO RELATED APPLICATION

This application is a continuation of International Application No. PCT/CN2020/138878, filed on Dec. 24, 2020, the disclosure of which is hereby incorporated by reference in its entirety.

FIELD

The application relates to downlink control signaling in wireless networks.

BACKGROUND

In some wireless networks, downlink (DL) and uplink (UL) transmissions are based on control signaling from a base station (BS), one of which is downlink control information (DCI), where all DL and UL transmissions of a user equipment (UE) will be based on scheduling information sent in a DCI for DL scheduling and scheduling information sent in another DCI for UL scheduling. The DCIs are sent via (or are carried in) a physical downlink control channel (PDCCH). In current networks, a UE receives DCI(s) based on blind detection among PDCCH candidates for DL and/or UL. In a given monitoring occasion during which there is a set of PDCCH candidates that may be used for DCI transmission, a single DCI for one link (DL or UL) scheduling of the UE may be transmitted in one of the PDCCH candidates; or, for example, a first DCI for DL scheduling and a second DCI for UL scheduling may be transmitted in two of the PDCCH candidates. The PDCCH candidates are defined by PDCCH search space (SS) set(s) in one or more control resource sets (CORESETs), and a size of each PDCCH candidate in units of resource blocks is defined by an aggregation level (AL) of CCE (control channel element). The UE may be configured to use at least one CORESET, and one or more SS sets are defined within each CORESET that defines frequency and time domain resources that may be used for DCI transmission. Each SS is a PDCCH candidate which also has a configured time domain resource, for example, the configured time domain resource may indicate one or more symbol(s) within a time period. These parameters may be pre-defined, semi-statically and/or dynamically configured for a UE or a group of UEs. Among the PDCCH candidates, any PDCCH candidate may be potentially used to carry one DCI (or DCIs); a PDCCH candidate that actually carries one DCI (or DCIs) is usually referred to as PDCCH (or PDCCH channel), or in other words, a PDCCH is conventionally referred to as a channel that has actually carried one DCI (or DCIs), and the PDCCH is one among a set of pre-defined or configured PDCCH candidates. An example for UE specific SS sets in a CORESET, where SSs for ALs of 4 and 8 are included, the SSs may include or be configured 6 PDCCH candidates for AL 4 and 4 PDCCH candidates for AL 8.

For an AL 4, a SS or PDCCH candidate can be used to transmit up to 288 resource elements (REs=4×6RB×12RE), breaking down for pilot and DCI information into 72 REs for pilot and 216 REs for DCI information, where up to 216 REs can be used to carry DCI information for either DL or UL scheduling.

For an AL 8, a SS or PDCCH candidate can be used to transmit up to 576 resource elements, breaking down for pilot and DCI information into 144 REs for pilot and 432 REs for DCI information.

All the SSs or PDCCH candidates are configured in a CORESET and their frequency domain resource locations for AL 4 and AL 8 SSs can be defined by, e.g., a hash function associated with the CORESET configuration, UE ID and slot # index, etc.

A PDCCH candidate can be allocated for DCI transmission by the base station as among the set of available PDCCH candidates for a link (DL or UL). The PDCCH candidate allocation may, for example, be performed to adapt to the channel conditions, DCI information length, and/or to multiplex (uniquely) DCIs for multiple UEs to share CORESET resources and/or a same time duration, e.g., the first symbol in a slot.

A UE performs PDCCH monitoring of the PDCCH candidates for DCIs that are for that UE. The UE does not know which PDCCH candidates, if any, were used to transmit DCI to the UE. A DCI that is for a particular UE is scrambled with a scrambling sequence associated with that UE. For example, the cyclic redundancy field (CRC) of a DCI may be scrambled with a UE-specific sequence, for example based on a UE-specific identifier such as a C-RNTI, a UE identity, etc. The DCI may be for a group of UEs including the UE, in which case the DCI is scrambled with a group-specific scrambling sequence associated with the group of UE, for example based on a group-specific identifier such as a G-RNTI. PDCCH monitoring involves trying one PDCCH candidate to another in determining whether there are one or more PDCCH candidate(s) that have been scrambled with a scrambling sequence associated with the UE, including a UE-specific scrambling sequence or a group specific scrambling sequence associated with a group that the UE belongs to. This can also be referred to as searching and blind detection. Usually, one or more DCIs may be detected among its PDCCH candidates for a UE in each monitoring occasion, depending on how many DCIs in terms of DL and/or UL DCIs to be monitored can be configured. However, the UE has to blindly detect any one or more of the DCIs that are usually semi-statically configured by the network. Moreover, when one or more DCIs are semi-statically configured for a UE, one PDCCH monitoring occasion may fewer DCIs or none of the DCIs scheduled by the base station in the monitoring occasion (which is usually not known to the UE). Thus, the blind detection is performed to find out which of these DCIs have been sent among the PDCCH candidates.

SUMMARY

According to one aspect of the present disclosure, there is provided a method in an apparatus, the method comprising: receiving, by the apparatus, a signaling of a configuration of PDCCH monitoring by the apparatus; receiving, by the apparatus, a first downlink control information (DCI) in a first physical downlink control channel (PDCCH) where the first DCI comprising at least one field indicating presence information of a second DCI in a second PDCCH; and decoding by the apparatus, the second DCI in the second PDCCH.

In some embodiments, the signaling of a configuration of PDCCH monitoring comprises one or more of semi-static signaling, dynamic signaling, medium access control (MAC) control entity (CE), radio resource control (RRC) signaling, layer 1 (L1) signaling.

In some embodiments, the signaling of a configuration of PDCCH monitoring comprises parameters of at least one or more of control resource set (CORESET), PDCCH candidates, search space (SS), PDCCH candidate indexing, PDCCH candidate time-frequency resources, PDCCH search ordering.

In some embodiments, the first PDCCH and the second PDCCH are among a set of PDCCH candidates or search spaces, wherein at least one PDCCH candidate or SS of the set of PDCCH candidates or search spaces is used for carrying at least one of the first DCI and the second DCI.

In some embodiments, the presence information of the second DCI in the second PDCCH comprises at least one of the following: an index or a value indicating a subset of resource from resource blocks in a CORESET; an index or a value indicating a number among configured CORESET resources; an index or value indicating a relative position of the second PDCCH candidate relative to the first PDCCH; an index or value indicating an absolute position of the second PDCCH as among a set of possible PDCCH candidates; an index or a value indicating an index number among a set of PDCCH candidates; an index or a value indicating a time-frequency resource area; an index or a value indicating partial or all CORESET resources; an index or a value indicating there is no second DCI; a bitmap including one bit for each PDCCH candidate.

Advantageously, this provides specific examples of the presence information directly indicated in the first DCI, thus reducing the UE PDCCH search to achieve UE power saving.

In some embodiments, the : the at least one field is a modification of one or more existing field(s); or the at least one field comprises one or more new field(s).

Adding the bits to an existing field has the advantage of not requiring a new field, whereas adding the bits in a new field has the advantage of not requiring modification of an existing field.

In some embodiments, the presence information of the second DCI in the second PDCCH comprises an n bit index defining as one or more of the following: all n bits are 0: there is no second DCI; the n bits represent a non-zero value j: skip $2^j$ PDCCH candidates to find and detect the second DCI.

This has the advantage of the possibility of a relatively small value for n, since the number of candidates skipped increases exponentially.

In some embodiments, at least one field includes an n+1 bit index defining as one or more of the following: one bit of the n+1 bits indicating whether the second DCI is present; n bits of the n+1 bits indicating position information of the second DCI.

Use of a separate bit to indicate whether the second DCI has an efficiency advantage in that the apparatus can stop processing once that bit incites there is no second DCI.

In some embodiments, the method further comprises: receiving a configuration a total number N of PDCCH candidates through radio resource control (RRC) signaling; wherein n is set such that $2^n \geq N$; a value of the n bits indicates the second PDCCH candidate within the N PDCCH candidates.

Receiving a configuration of N is advantageous in that the value of N can be changed if conditions warrant.

In some embodiments, receiving, by the apparatus, the first DCI in the first PDCCH comprises monitoring at least one PDCCH candidate within a set of PDCCH candidates to decode a PDCCH candidate scrambled with an identifier associated with the apparatus, and wherein the identifier associated with the apparatus is the apparatus identifier or a group identifier.

Advantageously, where the identifier is a UE identifier, this allows the presence information to be UE specific. On the other hand, when the identifier is a group identifier, this allows the identifier to be group specific. When the same signalling is to be sent to a group of UEs, the group specific approach will be more efficient from a system overhead standpoint.

In some embodiments, the set of PDCCH candidates have candidate indices that are pre-defined or RRC configured, where the candidate indices are mapped to real time-frequency locations.

Receiving a configuration of the PDCCH candidates is advantageous in that the set can be changed if necessary.

In some embodiments, the method further comprises: receiving a DCI that indicates there is no DCI in a current set of PDCCH candidates that includes UL scheduling or DL scheduling.

This allows the apparatus to know, upon receipt of the DCI, that it can stop searching for any DCI including UL scheduling or DL scheduling, and provides another mechanism to reduce searching, and therefore battery consumption, by the apparatus.

According to another aspect of the present disclosure, there is provided an apparatus comprising: at least one processor; and a memory storing processor-executable instructions that, when executed, cause the processor to: receive a signaling of a configuration of PDCCH monitoring by the apparatus; receive a first downlink control information (DCI) in a first physical downlink control channel (PDCCH) where the first DCI comprising at least one field indicating presence information of a second DCI in a second PDCCH; and decode the second DCI in the second PDCCH.

In some embodiments, the signaling of a configuration of PDCCH monitoring comprises one or more of semi-static signaling, dynamic signaling, medium access control (MAC) control entity (CE), radio resource control (RRC) signaling, layer 1 (L1) signaling.

In some embodiments, the signaling of a configuration of PDCCH monitoring comprises parameters of at least one or more of control resource set (CORESET), PDCCH candidates, (or search space (SS), PDCCH candidate indexing, PDCCH candidate time-frequency resources, PDCCH search ordering.

Advantageously, the apparatus can use the presence information to receive the second DCI without the need for additional searching. After the first DCI is found, the apparatus can go straight to receiving the second DCI. This savings in terms of searching results in savings in terms of battery usage the apparatus.

In some embodiments, the first PDCCH and the second PDCCH are among a set of PDCCH candidates or search spaces, wherein at least one PDCCH candidate or SS of the set of PDCCH candidates or search spaces is used for carrying at least one of the first DCI and the second DCI.

In some embodiments, the presence information of the second DCI in the second PDCCH comprises at least one of the following: an index or a value indicating a subset of resource from resource blocks in a CORESET; an index or a value indicating a number among configured CORESET resources; an index or value indicating a relative position of the second PDCCH candidate relative to the first PDCCH; an index or value indicating an absolute position of the second PDCCH as among a set of possible PDCCH candidates; an index or a value indicating an index number among a set of PDCCH candidates; an index or a value indicating a time-frequency resource area; an index or a value indicating partial or all CORESET resources; an index or a value indicating there is no second DCI; a bitmap including one bit for each PDCCH candidate.

Advantageously, this provides specific examples of the presence information.

In some embodiments, the at least one field is a modification of one or more existing fields(s) or; the at least one field comprise one or more new field(s).

Adding the bits to an existing field has the advantage of not requiring a new field, whereas adding the bits in a new field has the advantage of not requiring modification of an existing field.

In some embodiments, the presence information of the second DCI in the second PDCCH candidate comprises an n bit index having the following meaning: all n bits are 0: there is no second DCI; the n bits represent a non-zero value j: skip $2^j$ PDCCH candidates to find and detect the second DCI.

This has the advantage of the possibility of a relatively small value for n, since the number of candidates skipped increases exponentially.

In some embodiments, at least one field includes an n+1 bit index having the following meaning: one bit of the n+1 bits indicating whether the second DCI is present; n bits of the n+1 bits indicating position information of the second DCI.

Use of a separate bit to indicate whether the second DCI has an efficiency advantage in that the apparatus can stop processing once that bit incites there is no second DCI.

In some embodiments, the instructions, when executed, cause the processor to: receive a configuration a total number N of PDCCH candidates through radio resource control (RRC) signaling; wherein n is set such that $2^n \geq N$; a value of the n bits indicates the second PDCCH candidate within the N PDCCH candidates.

Receiving a configuration of N is advantageous in that the value of N can be changed if conditions warrant.

In some embodiments, receiving, by the apparatus, a first downlink control information (DCI) in a first physical downlink control channel (PDCCH) comprises monitoring at least one physical downlink control channel (PDCCH) candidate within a set of PDCCH candidates to find a PDCCH candidate scrambled with an identifier associated with the apparatus, and wherein the identifier associated with the apparatus is a user equipment (UE) identifier or a group identifier.

Advantageously, where the identifier is a UE identifier, this allows the presence information to be UE specific. On the other hand, when the identifier is a group identifier, this allows the identifier to be group specific. When the same signalling is to be sent to a group of UEs, the group specific approach will be more efficient from a system overhead standpoint.

In some embodiments, wherein the set of PDCCH candidates have candidate indices that are pre-defined or RRC configured, where the candidate indices are mapped to real time-frequency locations.

Receiving a configuration of the PDCCH candidates is advantageous in that the set can be changed if necessary.

In some embodiments, the instructions, when executed, cause the processor to: receive a DCI that indicates there is no DCI in a current set of PDCCH candidates that includes UL scheduling or DL scheduling.

According to another aspect of the present disclosure, there is provided a method in a network device, the method comprising: transmitting, by the network device, a signaling of a configuration of PDCCH monitoring; transmitting, by the network device, a first downlink control information (DCI) in a first physical downlink control channel (PDCCH), wherein the first DCI comprising at least one field indicating presence information of a second DCI in a second PDCCH.

In some embodiments, the signaling of a configuration of PDCCH monitoring comprises one or more of semi-static signaling, dynamic signaling, medium access control (MAC) control entity (CE), radio resource control (RRC) signaling, layer 1 (L1) signaling.

In some embodiments, the signaling of a configuration of PDCCH monitoring comprises parameters of at least one or more of control resource set (CORESET), PDCCH candidates search space (SS) , PDCCH candidate indexing, PDCCH candidate time-frequency resources, PDCCH search ordering.

In some embodiments, the first PDCCH and the second PDCCH are among a set of PDCCH candidates or search spaces, wherein at least one PDCCH candidate or SS of the set of PDCCH candidates or search spaces is used for carrying at least one of the first DCI and the second DCI.

In some embodiments, the presence information of the second DCI in the second PDCCH comprises at least one of the following: an index or a value indicating a subset of resource from resource blocks in a CORESET; an index or a value indicating a number among configured CORESET resources; an index or value indicating a relative position of the second PDCCH candidate relative to the first PDCCH; an index or value indicating an absolute position of the second PDCCH as among a set of possible PDCCH candidates; an index or a value indicating an index number among a set of PDCCH candidates; an index or a value indicating a time-frequency resource area; an index or a value indicating partial or all CORESET resources; an index or a value indicating there is no second DCI; a bitmap including one bit for each PDCCH candidate.

Advantageously, this provides specific examples of the presence information.

In some embodiments, the at least one field is a modification of one or more existing field(s); or the at least one field comprises one or more new field(s).

In some embodiments, the presence information of the second DCI in the second PDCCH candidate comprises an n bit index having the following meaning: all n bits are 0: there is no second DCI; the n bits represent a non-zero value j: skip $2^j$ PDCCH candidates to find and detect the second DCI.

In some embodiments, at least one field includes an n+1 bit index having the following meaning: one bit of the n+1 bits indicating whether the second DCI is present; n bits of the n+1 bits indicating position information of the second DCI.

In some embodiments, the method further comprises: transmitting a configuration a total number N of PDCCH candidates through radio resource control (RRC) signaling; wherein n is set such that $2^n \geq N$; a value of the n bits indicates the second PDCCH candidate within the N PDCCH candidates.

Receiving a configuration of N is advantageous in that the value of N can be changed if conditions warrant.

In some embodiments, the method further comprises: transmitting a DCI that indicates there is no DCI in a current set of PDCCH candidates that includes UL scheduling or DL scheduling.

According to another aspect of the present invention, there is provided a network device comprising: at least one processor; and a memory storing processor-executable instructions that, when executed, cause the processor to: transmit a signaling of a configuration of PDCCH monitoring; transmit a first downlink control information (DCI) in a first physical downlink control channel (PDCCH); wherein the first DCI comprising at least one field indicating presence information of a second DCI in a second PDCCH.

In some embodiments, the signaling of a configuration of PDCCH monitoring comprises one or more of semi-static signaling, dynamic signaling, medium access control (MAC) control entity (CE), radio resource control (RRC) signaling, layer 1 (L1) signaling.

In some embodiments, the signaling of a configuration of PDCCH monitoring comprises parameters of at least one or more of control resource set (CORESET), PDCCH candidates or search space (SS), PDCCH candidate indexing, PDCCH candidate time-frequency resources, PDCCH search ordering.

In some embodiments, the first PDCCH and the second PDCCH are among a set of PDCCH candidates or search spaces, wherein at least one PDCCH candidate or SS of the set of PDCCH candidates or search spaces is used for carrying at least one of the first DCI and the second DCI.

In some embodiments, the presence information of the second DCI in the second PDCCH comprises at least one of the following: an index or a value indicating a subset of resource from resource blocks in a CORESET; an index or a value indicating a number among configured CORESET resources; an index or value indicating a relative presence of the second PDCCH candidate relative to the first PDCCH; an index or value indicating an absolute presence of the second PDCCH as among a set of possible PDCCH candidates; an index or a value indicating an index number among a set of PDCCH candidates; an index or a value indicating a time-frequency resource area; an index or a value indicating partial or all CORESET resources; an index or a value indicating there is no second DCI; a bitmap including one bit for each PDCCH candidate.

In some embodiments, the at least one field is a modification of one or more existing field(s); or the at least one field comprises one or more new field(s).

In some embodiments, the presence information of the second DCI in the second PDCCH candidate comprises an n bit index having the following meaning: all n bits are 0: there is no second DCI; the n bits represent a non-zero value j: skip $2^j$ PDCCH candidates to find and detect the second DCI.

In some embodiments, at least one field includes an n+1 bit index having the following meaning: one bit of the n+1 bits indicating whether the second DCI is present; n bits of the n+1 bits indicating position information of the second DCI.

In some embodiments, the method further comprises: transmitting a configuration a total number N of PDCCH candidates through radio resource control (RRC) signaling; wherein n is set such that $2^n \geq N$; a value of the n bits indicates the second PDCCH candidate within the N PDCCH candidates.

In some embodiments, the method further comprises: transmitting a DCI that indicates there is no DCI in a current set of PDCCH candidates that includes UL scheduling or DL scheduling.

According to one aspect of the present disclosure, there is provided a method in an apparatus, the method comprising:

monitoring at least one physical downlink control channel (PDCCH) candidate within a set of PDCCH candidates to find a first PDCCH candidate associated with the apparatus;

obtaining a first downlink control information (DCI) from the first PDCCH candidate, the first DCI including at least one field indicating whether a second DCI is present or not in the set of PDCCH candidates;

when the at least one field indicates a second DCI is present, obtaining the second DCI from a second PDCCH candidate within the set of PDCCH candidates; and when the at least one field indicates a second DCI is not present, refraining from monitoring any further PDCCH candidate within the set of PDCCH candidates.

Optionally, when the at least one field indicates a second DCI is present, the at least one field indicates which PDCCH candidate within the set of PDCCH candidates is used for the second DCI, obtaining the second DCI from a second PDCCH candidate within the set of PDCCH candidates comprises obtaining the second DCI from the indicated PDCCH candidate.

Optionally, the at least one field comprises at least one bit indicating whether a second DCI is present and indicating which PDCCH candidate within the set of PDCCH candidates is used for the second DCI.

Optionally, monitoring at least one physical downlink control channel (PDCCH) candidate within a set of PDCCH candidates to find a first PDCCH candidate associated with the apparatus comprises monitoring for a PDCCH candidate scrambled with an identifier associated with the apparatus, and wherein the identifier associated with the apparatus is a user equipment (UE) identifier or a group identifier.

Optionally, the first DCI includes downlink scheduling or uplink scheduling.

Optionally, the second DCI includes downlink scheduling or uplink scheduling.

Optionally, the method further comprising: determining by the UE that there is no DCI in the set of PDCCH candidates for uplink and no DCI in the set of PDCCH candidates for downlink scheduling when the first DCI does not include downlink scheduling or uplink scheduling, and the at least one field indicates a second DCI is not present.

Optionally, determining by the UE that there is no DCI in the set of PDCCH candidates for uplink and no DCI in the set of PDCCH candidates for downlink scheduling when the first DCI does not include downlink scheduling or uplink scheduling is based on the first DCI including known or predefined contents in one or more of its DCI fields.

Optionally, the first DCI that does not include downlink scheduling or uplink scheduling is in a pre-defined or RRC configured PDCCH candidate within said set of PDCCH candidates.

Optionally, the monitoring at least one physical downlink control channel (PDCCH) candidate within a set of PDCCH candidates comprises using blind detection within the set of PDCCH candidates.

Optionally, the second DCI has at least one field indicating which PDCCH candidate within the set of PDCCH candidates is used for the first DCI.

Optionally, the set of PDCCH candidates have candidate indices that are pre-defined or RRC configured, where the candidate indices are mapped to real time-frequency locations.

BRIEF DESCRIPTION OF THE DRAWINGS

Embodiments of the disclosure will now be described with reference to the attached drawings in which.

DETAILED DESCRIPTION

The operation of the current example embodiments and the structure thereof are discussed in detail below. It should be appreciated, however, that the present disclosure provides many applicable inventive concepts that can be embodied in any of a wide variety of specific contexts. The specific embodiments discussed are merely illustrative of specific structures of the disclosure and ways to operate the disclosure, and do not limit the scope of the present disclosure.

Figure 1:
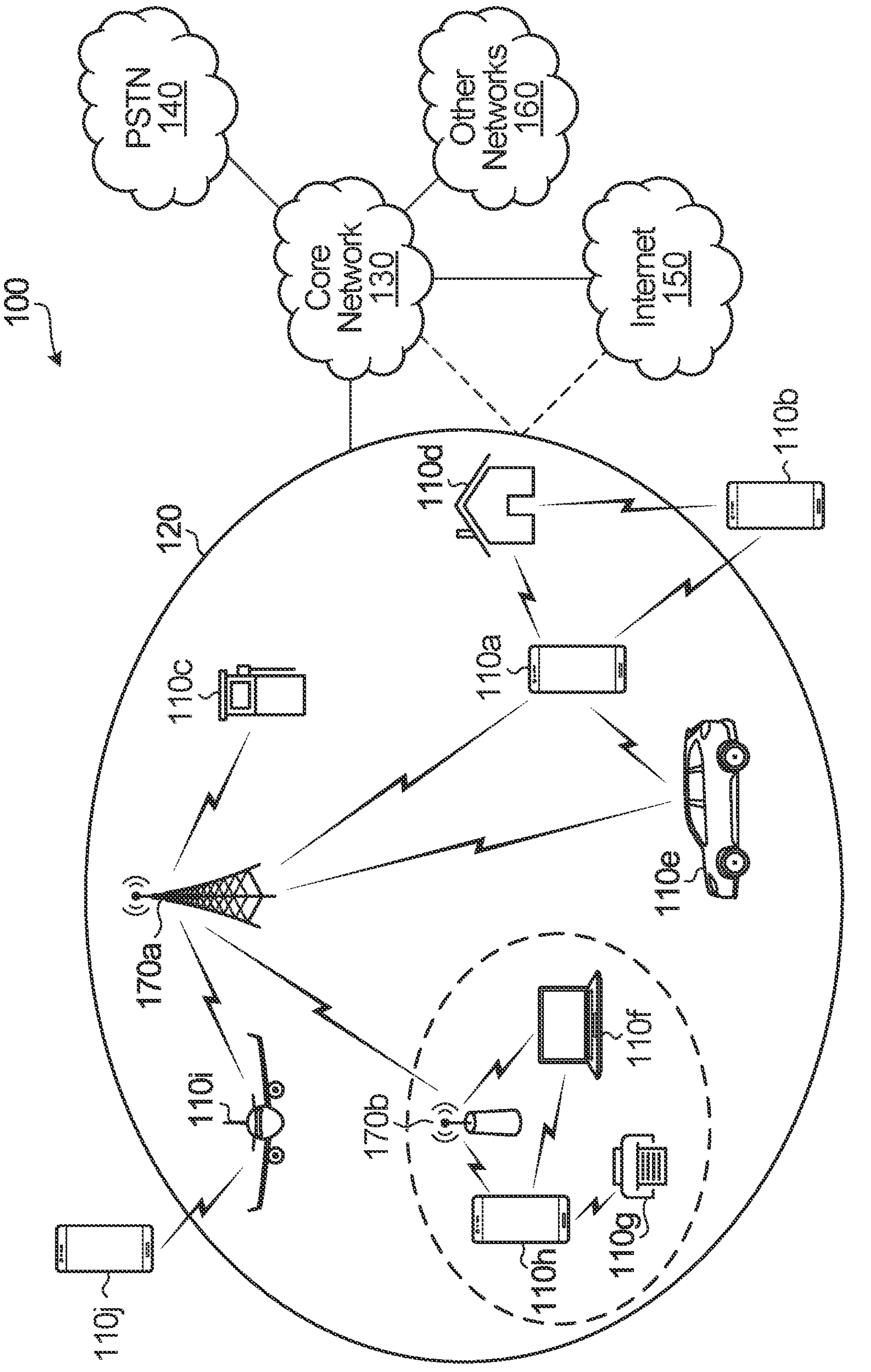
FIG. 1 is a block diagram of a communication system.

Referring to FIG. 1, as an illustrative example without limitation, a simplified schematic illustration of a communication system is provided. The communication system 100 comprises a radio access network 120. The radio access network 120 may be a next generation (e.g. sixth generation (6G) or later) radio access network, or a legacy (e.g. 5G, 4G, 3G or 2G) radio access network. One or more communication electric device (ED) 110*a*-120*j* (generically referred to as 110) may be interconnected to one another or connected to one or more network nodes (170*a*, 170*b*, generically referred to as 170) in the radio access network 120. A core network 130 may be a part of the communication system and may be dependent or independent of the radio access technology used in the communication system 100. Also the communication system 100 comprises a public switched telephone network (PSTN) 140, the internet 150, and other networks 160.

Figure 2:
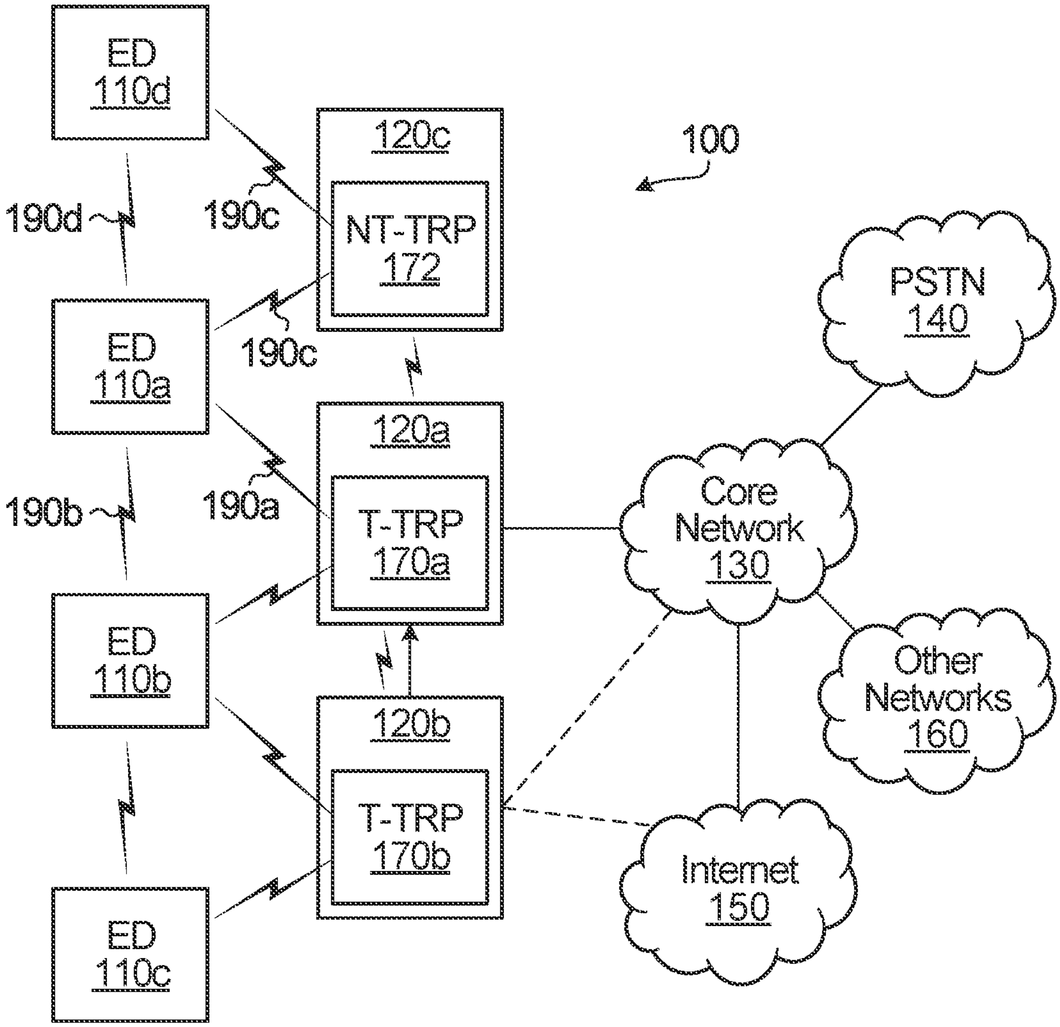
FIG. 2 is a block diagram of a communication system.

FIG. 2 illustrates an example communication system 100. In general, the communication system 100 enables multiple wireless or wired elements to communicate data and other content. The purpose of the communication system 100 may be to provide content, such as voice, data, video, and/or text, via broadcast, multicast and unicast, etc. The communication system 100 may operate by sharing resources, such as carrier spectrum bandwidth, between its constituent elements. The communication system 100 may include a terrestrial communication system and/or a non-terrestrial communication system. The communication system 100 may provide a wide range of communication services and applications (such as earth monitoring, remote sensing, passive sensing and positioning, navigation and tracking, autonomous delivery and mobility, etc.). The communication system 100 may provide a high degree of availability and robustness through a joint operation of the terrestrial communication system and the non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing, and faster physical layer link switching between terrestrial networks and non-terrestrial networks.

The terrestrial communication system and the non-terrestrial communication system could be considered sub-systems of the communication system. In the example shown, the communication system 100 includes electronic devices (ED) 110*a*-110*d* (generically referred to as ED 110), radio access networks (RANs) 120*a*-120*b*, non-terrestrial communication network 120*c*, a core network 130, a public switched telephone network (PSTN) 140, the internet 150, and other networks 160. The RANs 120*a*-120*b* include respective base stations (BSs) 170*a*-170*b*, which may be generically referred to as terrestrial transmit and receive points (T-TRPs) 170*a*-170*b*. The non-terrestrial communication network 120*c* includes an access node 120*c*, which may be generically referred to as a non-terrestrial transmit and receive point (NT-TRP) 172.

Any ED 110 may be alternatively or additionally configured to interface, access, or communicate with any other T-TRP 170*a*-170*b* and NT-TRP 172, the Internet 150, the core network 130, the PSTN 140, the other networks 160, or any combination of the preceding. In some examples, ED 110*a* may communicate an uplink and/or downlink transmission over an interface 190*a* with T-TRP 170*a*. In some examples, the EDs 110*a*, 110*b* and 110*d* may also communicate directly with one another via one or more sidelink air interfaces 190*b*. In some examples, ED 110*d* may communicate an uplink and/or downlink transmission over an interface 190*c* with NT-TRP 172.

The air interfaces 190*a* and 190*b* may use similar communication technology, such as any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190*a* and 190*b*. The air interfaces 190*a* and 190*b* may utilize other higher dimension signal spaces, which may involve a combination of orthogonal and/or non-orthogonal dimensions.

The air interface 190*c* can enable communication between the ED 110*d* and one or multiple NT-TRPs 172 via a wireless link or simply a link. For some examples, the link is a dedicated connection for unicast transmission, a connection for broadcast transmission, or a connection between a group of EDs and one or multiple NT-TRPs for multicast transmission.

The RANs 120*a* and 120*b* are in communication with the core network 130 to provide the EDs 110*a* 110*b*, and 110*c* with various services such as voice, data, and other services. The RANs 120*a* and 120*b* and/or the core network 130 may be in direct or indirect communication with one or more other RANs (not shown), which may or may not be directly served by core network 130, and may or may not employ the same radio access technology as RAN 120*a*, RAN 120*b* or both. The core network 130 may also serve as a gateway access between (i) the RANs 120*a* and 120*b* or EDs 110*a* 110*b*, and 110*c* or both, and (ii) other networks (such as the PSTN 140, the Internet 150, and the other networks 160). In addition, some or all of the EDs 110*a* 110*b*, and 110*c* may include functionality for communicating with different wireless networks over different wireless links using different wireless technologies and/or protocols. Instead of wireless communication (or in addition thereto), the EDs 110*a* 110*b*, and 110*c* may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), User Datagram Protocol (UDP). EDs 110*a* 110*b*, and 110*c* may be multimode devices capable of operation according to multiple radio access technologies, and incorporate multiple transceivers necessary to support such.

Figure 3:
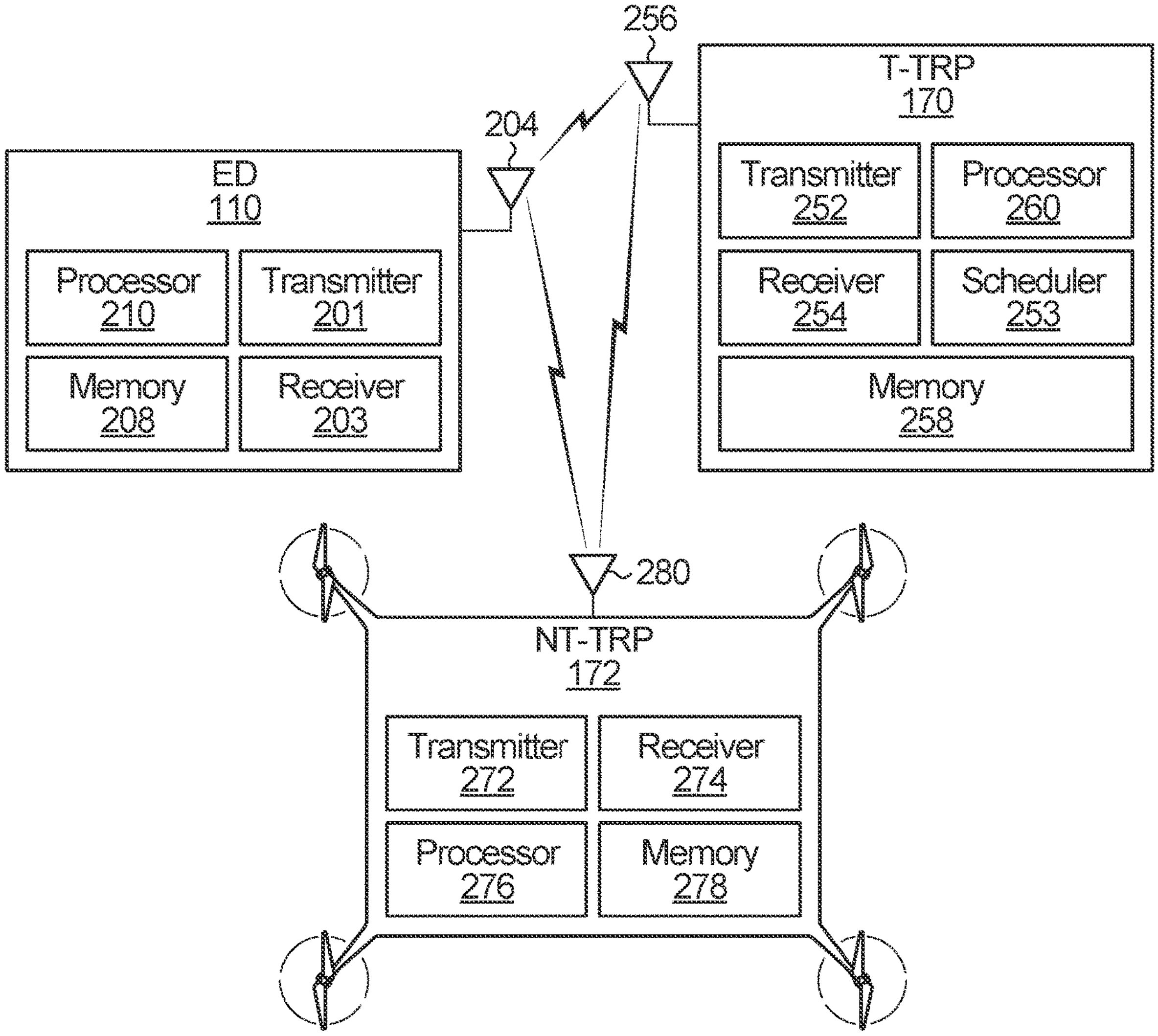
FIG. 3 is a block diagram of a communication system showing a basic component structure of an electronic device (ED) and a base station.

FIG. 3 illustrates another example of an ED 110 and a base station 170*a*, 170*b* and/or 170*c*. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), internet of things (IOT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g. communication module, modem, or chip) in the forgoing devices, among other possibilities. Future generation EDs 110 may be referred to using other terms. The base station 170*a* and 170*b* is a T-TRP and will hereafter be referred to as T-TRP 170. Also shown in FIG. 3, a NT-TRP will hereafter be referred to as NT-TRP 172. Each ED 110 connected to T-TRP 170 and/or NT-TRP 172 can be dynamically or semi-statically turned-on (i.e., established, activated, or enabled), turned-off (i.e., released, deactivated, or disabled) and/or configured in response to one of more of: connection availability and connection necessity.

The ED 110 includes a transmitter 201 and a receiver 203 coupled to one or more antennas 204. Only one antenna 204 is illustrated. One, some, or all of the antennas may alternatively be panels. The transmitter 201 and the receiver 203 may be integrated, e.g. as a transceiver. The transceiver is configured to modulate data or other content for transmission by at least one antenna 204 or network interface controller (NIC). The transceiver is also configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 210. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache, and the like.

The ED 110 may further include one or more input/output devices (not shown) or interfaces (such as a wired interface to the internet 150 in FIG. 1). The input/output devices permit interaction with a user or other devices in the network. Each input/output device includes any suitable structure for providing information to or receiving information from a user, such as a speaker, microphone, keypad, keyboard, display, or touch screen, including network interface communications.

The ED 110 further includes a processor 210 for performing operations including those related to preparing a transmission for uplink transmission to the NT-TRP 172 and/or T-TRP 170, those related to processing downlink transmissions received from the NT-TRP 172 and/or T-TRP 170, and those related to processing sidelink transmission to and from another ED 110. Processing operations related to preparing a transmission for uplink transmission may include operations such as encoding, modulating, transmit beamforming, and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g. by detecting and/or decoding the signaling). An example of signaling may be a reference signal transmitted by NT-TRP 172 and/or T-TRP 170. In some embodiments, the processor 276 implements the transmit beamforming and/or receive beamforming based on the indication of beam direction, e.g. beam angle information (BAI), received from T-TRP 170. In some embodiments, the processor 210 may perform operations relating to network access (e.g. initial access) and/or downlink synchronization, such as operations relating to detecting a synchronization sequence, decoding and obtaining the system information, etc. In some embodiments, the processor 210 may perform channel estimation, e.g. using a reference signal received from the NT-TRP 172 and/or T-TRP 170.

Although not illustrated, the processor 210 may form part of the transmitter 201 and/or receiver 203. Although not illustrated, the memory 208 may form part of the processor 210.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP)), a site controller, an access point (AP), or a wireless router, a relay station, a remote radio head, a terrestrial node, a terrestrial network device, or a terrestrial base station, base band unit (BBU), remote radio unit (RRU), active antenna unit (AAU), remote radio head (RRH), central unit (CU), distribute unit (DU), positioning node, among other possibilities. The T-TRP 170 may be macro BSs, pico BSs, relay node, donor node, or the like, or combinations thereof. The T-TRP 170 may refer to the forging devices or apparatus (e.g. communication module, modem, or chip) in the forgoing devices.

In some embodiments, the parts of the T-TRP 170 may be distributed. For example, some of the modules of the T-TRP 170 may be located remote from the equipment housing the antennas of the T-TRP 170, and may be coupled to the equipment housing the antennas over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment housing the antennas of the T-TRP 170. The modules may also be coupled to other T-TRPs. In some embodiments, the T-TRP 170 may actually be a plurality of T-TRPs that are operating together to serve the ED 110, e.g. through coordinated multipoint transmissions.

The T-TRP 170 includes at least one transmitter 252 and at least one receiver 254 coupled to one or more antennas 256. Only one antenna 256 is illustrated. One, some, or all of the antennas may alternatively be panels. The transmitter 252 and the receiver 254 may be integrated as a transceiver. The T-TRP 170 further includes a processor 260 for performing operations including those related to: preparing a transmission for downlink transmission to the ED 110, processing an uplink transmission received from the ED 110, preparing a transmission for backhaul transmission to NT-TRP 172, and processing a transmission received over backhaul from the NT-TRP 172. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. The processor 260 may also perform operations relating to network access (e.g. initial access) and/or downlink synchronization, such as generating the content of synchronization signal blocks (SSBs), generating the system information, etc. In some embodiments, the processor 260 also generates the indication of beam direction, e.g. BAI, which may be scheduled for transmission by scheduler 253. The processor 260 performs other network-side processing operations described herein, such as determining the location of the ED 110, determining where to deploy NT-TRP 172, etc. In some embodiments, the processor 260 may generate signaling, e.g. to configure one or more parameters of the ED 110 and/or one or more parameters of the NT-TRP 172. Any signaling generated by the processor 260 is sent by the transmitter 252. Note that "signaling", as used herein, may alternatively be called control signaling. Dynamic signaling may be transmitted in a control channel, e.g. a physical downlink control channel (PDCCH), and static or semi-static higher layer signaling may be included in a packet transmitted in a data channel, e.g. in a physical downlink shared channel (PDSCH).

A scheduler 253 may be coupled to the processor 260. The scheduler 253 may be included within or operated separately from the T-TRP 170, which may schedule uplink, downlink, and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or receiver 254. Also, although not illustrated, the processor 260 may implement the scheduler 253. Although not illustrated, the memory 258 may form part of the processor 260.

The processor 260, the scheduler 253, and the processing components of the transmitter 252 and receiver 254 may each be implemented by the same or different one or more processors that are configured to execute instructions stored in a memory, e.g. in memory 258. Alternatively, some or all of the processor 260, the scheduler 253, and the processing components of the transmitter 252 and receiver 254 may be implemented using dedicated circuitry, such as a FPGA, a GPU, or an ASIC.

Although the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110, processing an uplink transmission received from the ED 110, preparing a transmission for backhaul transmission to T-TRP 170, and processing a transmission received over backhaul from the T-TRP 170. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. In some embodiments, the processor 276 implements the transmit beamforming and/or receive beamforming based on beam direction information (e.g. BAI) received from T-TRP 170. In some embodiments, the processor 276 may generate signaling, e.g. to configure one or more parameters of the ED 110. In some embodiments, the NT-TRP 172 implements physical layer processing, but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or receiver 274. Although not illustrated, the memory 278 may form part of the processor 276.

The processor 276 and the processing components of the transmitter 272 and receiver 274 may each be implemented by the same or different one or more processors that are configured to execute instructions stored in a memory, e.g. in memory 278. Alternatively, some or all of the processor 276 and the processing components of the transmitter 272 and receiver 274 may be implemented using dedicated circuitry, such as a programmed FPGA, a GPU, or an ASIC. In some embodiments, the NT-TRP 172 may actually be a plurality of NT-TRPs that are operating together to serve the ED 110, e.g. through coordinated multipoint transmissions.

The T-TRP 170, the NT-TRP 172, and/or the ED 110 may include other components, but these have been omitted for the sake of clarity.

Figure 4:
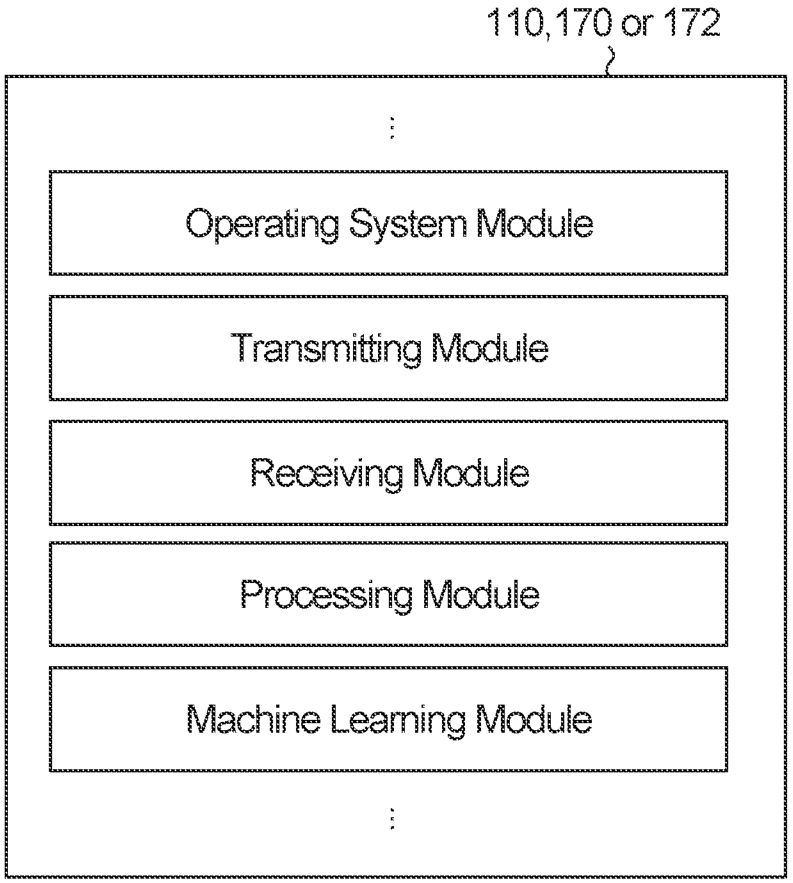
FIG. 4 is a block diagram of modules that may be used to implement or perform one or more of the steps of embodiments of the application.

One or more steps of the embodiment methods provided herein may be performed by corresponding units or modules, according to FIG. 4. FIG. 4 illustrates units or modules in a device, such as in ED 110, in T-TRP 170, or in NT-TRP 172. For example, a signal may be transmitted by a transmitting unit or a transmitting module. For example, a signal may be transmitted by a transmitting unit or a transmitting module. A signal may be received by a receiving unit or a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs 110, T-TRP 170, and NT-TRP 172 are known to those of skill in the art. As such, these details are omitted here.

How many DCIs (e.g. 2) that a UE is to monitor in a PDCCH occasion may be semi-statically (e.g., RRC) configured, but the actual number of DCIs transmitted may be varying dynamically from the BS scheduler based on, e.g., multi-UE traffic transmission and channel conditions, but the UE has to monitor and try to blind detect the number of semi-statically configured DCI(s).

Figure 5:
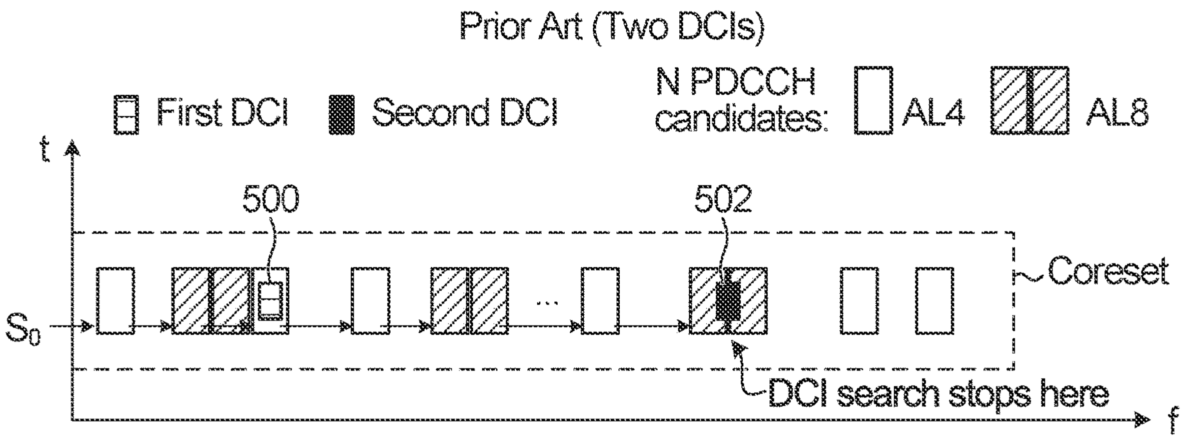
FIGS. 5 and 6 depict two examples of conventional PDCCH monitoring.

FIG. 5 shows an example of PDCCH monitoring where two DCIs are configured to be monitored and two DCIs are really both transmitted in this monitoring occasion. FIG. 5 shows a set of N PDCCH candidates including candidates for AL 4 and candidates for AL 8. Time is in the vertical direction, and frequency (in units of frequency resource blocks or subcarriers) is in the horizontal location. All of the resources shown in FIG. 5 are part of a single duration within a CORESET, e.g. the first symbol of a slot. As described above, for example, PDCCH candidates for AL 4 may occupy 24 RBs, while PDCCH candidates for AL 8 may occupy 48 RBs. In the example of FIG. 5, there is a first DCI 500 and a second DCI 502 in this PDCCH monitoring occasion. In a specific example, the UE searches (i.e. performs blind detection) the PDDCH candidates in order of their indexing (logically located over frequency direction), i.e. the candidates from left to right in FIG. 5. The UE, along this PDDCH logical indexing for blind detection, will find the first DCI 500 at the third PDCCH candidate after searching 2PDCCH candidates, and will continue search one search space after another along the PDCCH ordering, and then find the second DCI 502 at the seventh PDCCH candidate after searching all further PDCCH candidates from the PDCCH candidate including the first DCI up to the PDCCH candidate including the second DCI. Note that the PDCCH candidates may be pre-defined or semi-statically configured; that is the UE knows where each PDCCH candidate time-frequency resource or a corresponding space search is located (in terms of, e.g., an AL-4 SS or an AL-8 SS). Give that PDCCH candidates pre-defined or configured, UE may take different searching orders among the PDCCH candidates. Which DCI is "first" is a function of the order that the UE conducts the blind searching. For example, the UE may search all the PDCCH candidates of one AL (e.g. AL 4) and then start searching the PDCCH candidates of the other AL (e.g. AL 8). The UE can stop searching after the second DCI is found as there will not be a third DCI configured to be detected in this case.

More generally, the UE performs blind detection using an associate identifier of the UE, such as UE C-RNTI, using one or more configured aggregation levels, each having some number of PDCCH candidates pre-defined or configured. In the above, example, the UE is configured with aggregation levels 4 and 8, having N1 and N2, respectively, PDCCH candidates, thus the UE having a total of N (=N1+N2) PDCCH candidates.

In a case where there are two DCIs, one of which may be a DL DCI, and one of which may be an UL DC, the DL and UL DCI positions are assigned any two among these PDCCH candidates by BS, but the assigned locations are not known to the UE before the PDCCH blind detection by the UE in a monitoring occasion. In a case where a first DCI is detected at the jth PDCCH candidate, and a second DCI is detected at the mth PDCCH candidate, the UE performs blind detection for a total of m N PDCCH candidates. This example is shown in FIG. 5, as described above.

Figure 6:
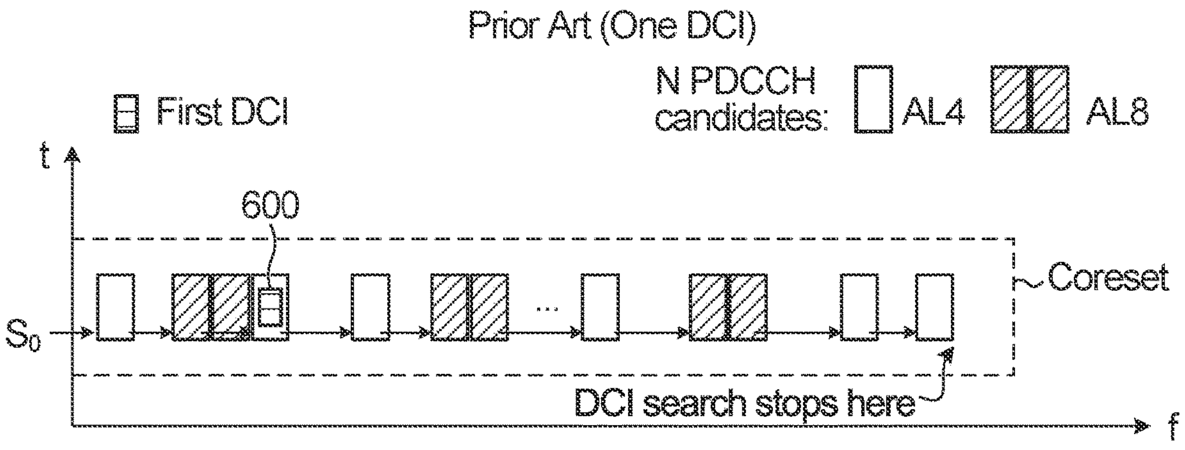

In a case where there is only one DCI really transmitted in a monitoring occasion by BS, while the two DCIs were configured to be monitored in each PDCCH occasion for the UE, following detection of that DCI, the UE does not know that there is no second DCI, thus the UE performs PDCCH blind detection to detect all N PDCCH candidates to make sure there is no second DCI. This example is shown in FIG. 6, where the PDCCH candidates are the same as in FIG. 5, and there is a single DCI 600 transmitted only by BS, with the configuration that the UE may need to monitor two DCIs in any of PDCCH occasions.

As described above, a UE may monitor a set of PDCCH candidates within a monitoring occasion and search DL and UL PDCCH SS sets independently. In the case in which two DCIs (e.g., one is for DL scheduling or UL scheduling, and the other is for UL scheduling or DL scheduling) are configured for a monitoring occasion, the UE has to do blind detection one candidate after another until the two DCIs are found among the search spaces (or PDCCH candidates) within a CORESET. If there is only one DCI sent to the UE by the base station, the UE performs blind detection one candidate after another across all the PDCCH candidates before the UE can figure out that only one DCI is sent in this PDCCH monitoring occasion. Furthermore, if there is no DCI for the UE, the UE performs blind detection one candidate after another across all the PDCCH candidates before it can figure out that there is no DCI sent in this PDCCH monitoring occasion. As a result, the UE may take significant effort and energy on PDCCH blind detection to detect DCI messages that may even not appear.

Therefore, it would be a new solution to save PDCCH blind detection efforts and thus reduce power consumption by the UE. Apparatus and methods that enhance the blind detection on PDCCH candidates for DCI message(s) for DL and/or UL traffic scheduling are provided that involve using one DCI to indicate if another DCI being present and/or the location of another DCI, or the using each of two DCIs to indicate the respective location of the other of the two DCIs. The provided systems and methods reduce significantly the needed amount of blind detection. For example, for a typical configuration of one DCI for DL transmission and one DCI for UL transmission for a UE to monitor a PDCCH occasion, the provided systems and methods address how to reduce the blind detection in this typical configuration when two DCIs both appear, only one DCI appears, or none of the DCIs appears in the monitoring occasion.

To achieve this, a first DCI in a first PDCCH candidate (e.g. in one or more fields of the DCI) includes at least one field indicating a position information of a second DCI in a second PDCCH. The position information may for example indicate if there is a second DCI in the current PDCCH monitoring occasion and if yes, where is the PDCCH candidate location used for carrying the second DCI. For example, some bits can be used in a DCI field, which may be a modified existing field, and/or a new field, for this type of position information. A PDCCH monitoring occasion may include a set of PDCCH candidates that may, for example be associated with one or more CORESETs.

While the embodiments described below all refer to position information being included in the first stage DCI, alternatively, presence information may be used.

In some embodiments, the presence information indicates if the second DCI present or not; this may be accompanied by separate position information.

In some embodiments, the presence information is a field that indicates either there is no second DCI, or indicates the position of the second DCI, in other words, some values of the presence information indicate there is no second DCI, and some values of the presence information provide position information for the second DCI.

This use of such position information mechanism may expand to wider applicability. For example, it can be used for any mode or state (e.g., active, Inactive, idle, etc.), and transmission scheme (frequency division duplex (FDD)/time division duplex (TDD)/Full Duplexing. The method can also be applied to control scheduling for a group of UEs, in which case the DCIs are relevant to a group. The method can also be applied to control scheduling for sidelink transmission, in which the DCIs including the position information are control signalling from the network relevant to sidelink transmission. The method can also be applied to control scheduling for sidelink transmission, in which the position information is included in sidelink control information (SCI) transmitted from one UE to another in respect of sidelink transmission. The method can also be applied to control transmission in unlicensed spectrum, in which case the DCIs are relevant to transmission in the unlicensed spectrum. The method can also be applied to control transmission in a sensing situation, in which case the DCIs are relevant to transmission in the sensing procedure, e.g., a Uu link DCI from BS may include an indication to another DCI present for scheduling sensing operation. The method can be applied to control scheduling in, for example, IAB transmission, a drone transmission, terrestrial transmission, non-terrestrial transmission (e.g. in Non Terrestrial Networks), integrated terrestrial and non-terrestrial transmission, etc.

Many detailed signalling examples are provided below. The position information can take various forms. Examples include one or more of the following:

- an indication in a first DCI of whether there is a second DCI;
- an indication in a first DCI of the location of a second DCI;
- an indication in a first DCI of whether a second DCI is present and (if yes) the location of the second DCI.

The location of the second DCI can be indicated in various manners, including one or more of the following:

- an index or value indicating a time-frequency resource of the second PDCCH candidate as among a set of possible PDCCH candidates;
- an index or a value indicating an indexing number among PDCCH candidates;
- an index or a value indicating a subset of resource from resource blocks in a CORESET;
- an index or a value indicating a number among configured CORESET resources;
- an index or a value explicitly indicating a time frequency resource of the second PDCCH;
- an index or a value indicating there is no second DCI;
- a bitmap including one bit for each PDCCH candidate.
- at least one field that is a modification of at least one existing field;
- at least one new field;
- a combination of at least one field that is a modification of at least one existing field and at least one new field.

In some embodiments, the at least one field that includes the position information also has another purpose. In this case, the at least one field includes bits for the position information and bits for the other purpose.

In some embodiments, the at least one field that includes the position information is dedicated to only the position information. In this case, it is an entirely new field.

Detailed examples are provided below. From the base station perspective, the scheduling of DCI(s) for a UE may be done at a medium access control (MAC) entity, including which DCI type(s) to use and which PDCCH candidate(s) will carry the DCI(s). Thus for two DCIs that have been scheduled and are to be transmitted for a UE in a PDCCH monitoring occasion, the base station has the information necessary to include in a first DCI the position information for the second DCI, and vice versa when mutual indications are used.

On the UE side, once the first DCI is detected, the UE does not need to perform blind detection for the second DCI. Instead, the UE uses the position information in the first DCI to directly obtain the indicated resource (e.g. PDCCH candidate) for detection of the second DCI.

In some embodiments, assuming that two DCIs for a UE to monitor in a PDCCH occasion may be semi-statically (e.g., RRC) configured, when there is no second DCI in a PDCCH occasion, i.e. only one DCI is transmitted within the monitoring occasion, the base station includes an indication in the one DCI that indicates to the UE that only one DCI is present. Upon receipt of such an indication, the UE can stop searching for that monitoring occasion, knowing that it will not miss any further DCI. In this case, the first DCI includes either position information for the second DCI, or/and the indication that there is only one DCI. Alternatively, the first DCI includes a positive indication of the presence or absence of the second DCI, and/or in the case of the second DCI being present, the first DCI includes position information for the second DCI. In some cases, there is no separate indication of whether or not there is a second DCI, but a specific value of the position information is used to indicate there is no second DCI.

In some embodiments, when there is no DCI including uplink or downlink scheduling information, the base station transmits a simplified DCI to notify the UE of this situation.

The DCI is simplified in the sense that it does not include any scheduling information or simply predefined fixed bit value(s) in one or more fields. The UE will stop searching once the simplified DCI is detected by the UE. The sending of the simplified DCI may consume additional time and frequency resources in the network. However, the alternative to including this involves the UE needing to search all the PDCCH candidates before it determines that there is no DCI including scheduling information from the base station that it needs to process. Thus, there is a trade-off between additional network resources and the blind detection saving. In some embodiments, the simplified DCI is sent at a fixed location in terms of pre-defined time and frequency resource. In other embodiments, the simplified DCI is sent in a location that is not fixed.

In some embodiments, UE may be predefined or semi-statically (e.g., RRC) configured to monitor PDCCH channel for possible DCI message(s) in a time instant/occasion (e.g., at the beginning of a slot) where searching on multiple PDCCH candidates in one CORESET (that is configured with time and frequency area in which the multiple PDCCH candidates, or search spaces, are defined/configured) is to be performed. It is noted that, in general, there can be more than one CORESET configured for the UE, but the configuration may notify the UE which CORESET(s) (if multiple CORESETs) to monitor and detect in the time instant/occasion. The total number of PDCCH candidates (or search space set) depends on how many ALs and the number of candidates per AL configured for the UE, and the UE PDCCH candidates and their corresponding PHY time-frequency resources, as well as DCI formats, are also predefined/configured.

To indicate in at least one field of one (e.g., first) DCI another (e.g., second) DCI present in a PDCCH candidate, the PDCCH candidate may be indicated in different ways based on which the UE is able to figure out its time-frequency resource and directly detect the PDCCH candidate. In other embodiments, PDCCH candidate indexing to map to its corresponding PHY resource for detection can be employed, which may be pre-defined or RRC configured such that each PDCCH candidate index value among the configured PDCCH candidates in one monitoring occasion for a UE may be unique and thus the at least one field may include a PDCCH candidate index value to indicate a SS indexing as well as a unique mapping to the time-frequency resource, which is pre-defined or configured by BS to the UE (i.e., the UE knows the SS indexing order and mapping to each SS's PHY resource based on these pre-definitions or configurations). However, in a PDCCH occasion, the scheduled DCI(s) and which PDCCH candidates to carry the DCI(s) among the PDCCH candidates are determined dynamically by BS, which is not known to the UE; the PDCCH candidate(s) carrying the DCI(s) can be indicated by corresponding PDCCH/SS index value(s), and each SS index value on one (scheduled) DCI can be indicated by another (scheduled) DCI in its one or more DCI fields. In another embodiment, with the pre-defined or configured SS (unique) indexing among the PDCCH candidates, if a search ordering by a UE is also pre-defined or configured, there are two ways in the first DCI to indicate the PDCCH candidate that carries the second DCI: either absolute index value or relative indexing, where the relative indexing indicates a distance, in terms of indexing number, from the index of the first DCI to the index value of the second DCI. For example, if the PDCCH candidate index value for the first DCI is I1, the relative indexing of L means that the PDCCH candidate index value of the second DCI is a function of I1 and L, e.g., I1+L. Note that an indication of other ways may be also possible to achieve these goals. As a result, once the UE detects an SS index value on the second DCI from the first DCI, the UE is able to figure out which PDCCH candidate is carrying the second DCI and directly go the SS for detection, thus the proposed schemes avoid the need for blind detection on the second DCI once the first DCI is (e.g., blindly) detected. For example, the UE can monitor the PDCCH channel in a time instant/occasion, first tries blind detection of the first DCI and checks the specific DCI field(s), and then based on the indication from the first DCI, either stops detection on any other PDCCH candidates if the second DCI is indicated not present, or jumps to the specific PDCCH candidate (indicated by the specific DCI field(s)) to detect the second DCI (message).

A BS can dynamically schedule the PDCCH candidate to carry the first stage DCI message. Though which one candidate to actually carry the first stage DCI message in a DL monitoring occasion may not be known to UE, the UE has prior knowledge of the format of the first stage DCI format and its length, for example based on configuration information, and thus the UE is able to detect the first stage DCI message intended for it via CRC descrambling by the UE ID.

In some embodiments, one or more parameters are set for the UE and/or operation options are configured on the UE that control the format of the position information and/or how the position information is employed. This can involve, for example, setting up whether or not to use the position information, and setting up the meaning of the position information to name a few specific examples. The parameters and/or operation option configurations for the provided method can, for example, be transmitted to the UE using semi-static signalling, dynamic signaling. Signaling such as radio resource control (RRC), DCI, MAC CE, sidelink signalling, may be used for this purpose. The signaling may be from or initiated by a base station, a device in a network (Terrestrial Network, TN/ Non-Terrestrial Network, NTN), and/or a device in the case of sidelink or sensing communications. Alternatively, some or all of the parameters and/or operation option configurations may be predefined.

The provided methods can significantly reduce blind detection efforts. The provided methods may lead to significant energy/power saving as well as computational complexity saving for the UE. These methods may enhance signal processing efficiency and lower the transmission latency in the air-interface.

In some embodiments, the additional bits in the one or more fields of the first DCI may also indicate other related information that may include one of, or a combination of two or more of:

PDCCH monitoring pattern or periodicity, for example based on self-learning of traffic pattern using an artificial intelligent scheme;

an indication of another DCI or other DCIs located in a different carrier;

how many following time slots UE can be skipped without doing any PDCCH monitoring before the UE starts the PDCCH monitoring and detection again. for an example, the indication of skipping 10 slots or sub-frames for PDCCH monitoring and blind detection;

dynamic activation or deactivation of the PDCCH monitoring within a time period;

dynamic traffic loading information.

an indication of sensing configuration and/or scheduling.

Figure 7:
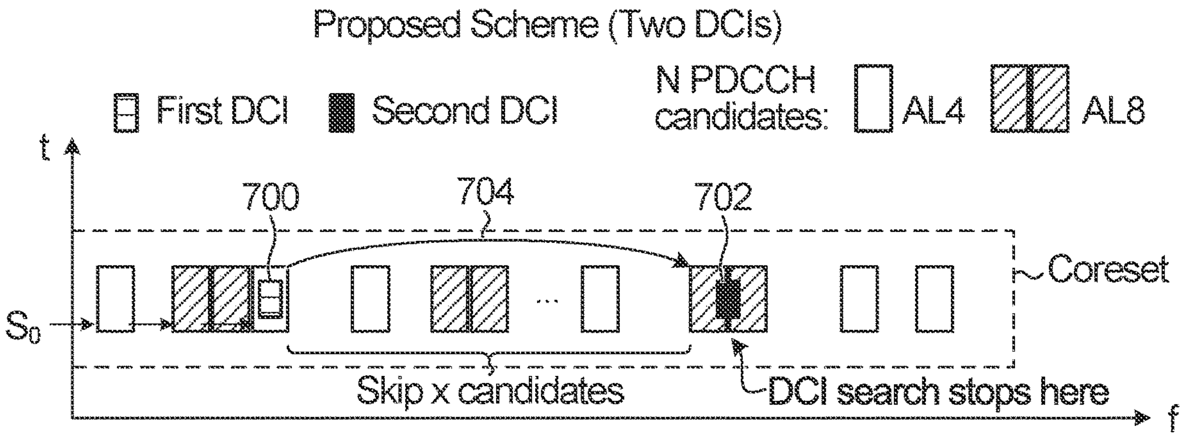
FIGS. 7, 9 to 11 are examples of PDCCH monitoring provided by embodiments of the application.

An example of the use of the enhanced PDCCH monitoring procedure, with two DCIs scheduled by the base station in a UE PDCCH monitoring occasion, is shown in FIG. 7. In the example of FIG. 7, there is a first DCI 700 that includes a field (or DCI fields) indicating position information of the second DCI 702. With this approach, once the first DCI is detected by a UE, the UE processes the first DCI to obtain the position information. The position information allows the UE to determine which PDCCH candidate carries the second DCI message. The UE can then skip intervening PDCCH candidates and skip directly to the determined PDCCH candidate to detect the second DCI message. The UE saves the effort of conducting blind searching efforts for the intervening PDCCH candidates. In this example, the position information is unidirectional, in the sense that only the first DCI includes position information of the second DCI. This unidirectional indication is depicted graphically with arrow 704.

Note that the PDCCH candidate locations of FIG. 7 and the other Figures herein are used to demonstrate the concept. The PDCCH candidates may not necessarily be arranged in an orderly manner as depicted; for example, the PDCCH candidate locations for each AL may depend on a hash function and PDCCH candidate indexing can be applied to same AL PDCCH candidates (SSs) first (e.g., AL of 4) and over different ALs (e.g., from SSs with AL of 4 to SSs with AL of 8) .

Figure 8:
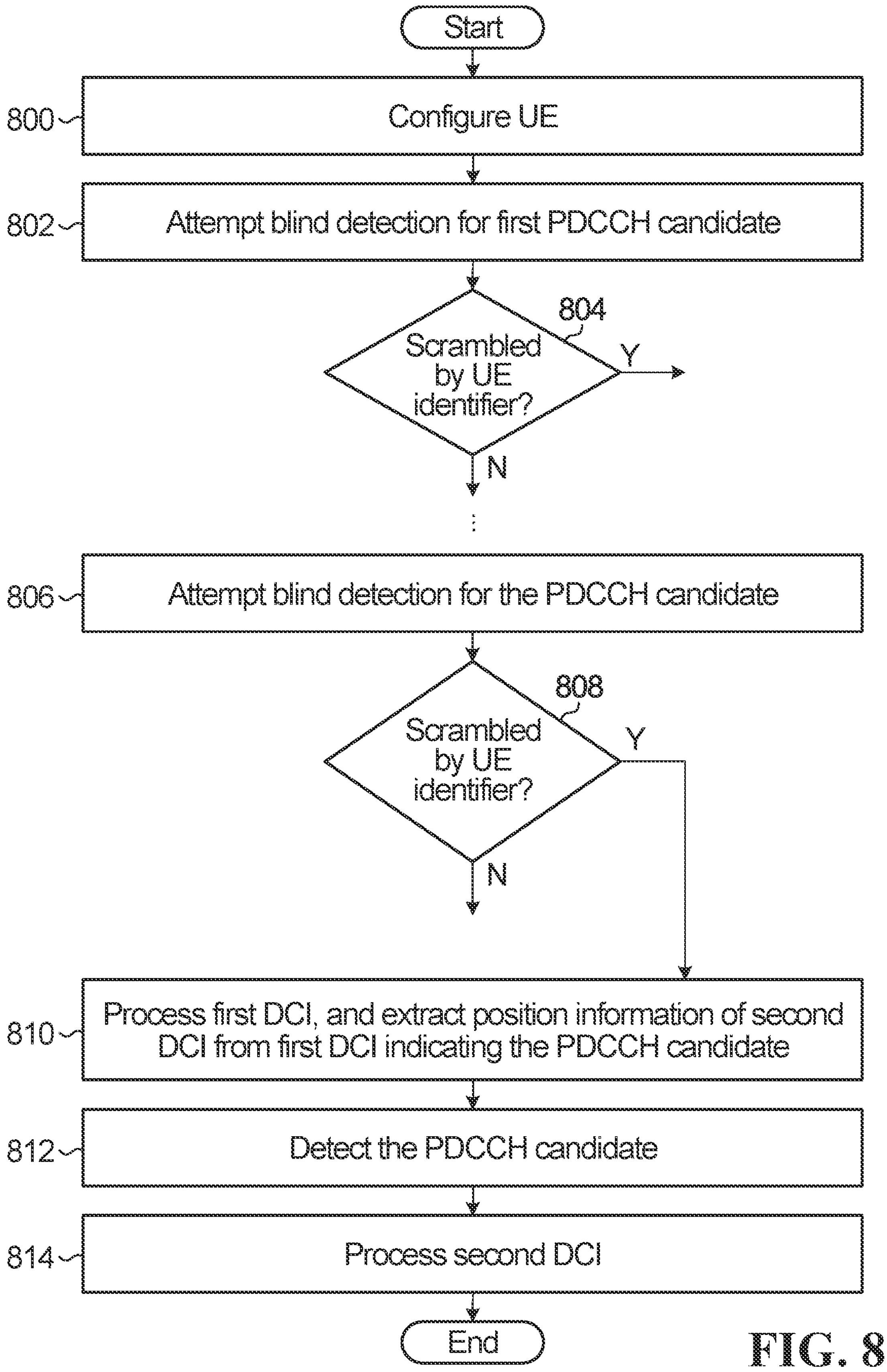
FIG. 8 is a flowchart of a method of PDCCH monitoring provided by an embodiment of the application.

FIG. 8 is a flowchart of a method of performing blind detection provided by an embodiment of the application. The method begins at 800 with the UE receiving (or otherwise obtaining) parameters/configuration information, including configurations on CORESET(s), AL(s) of PDCCH candidates, locations of the PDCCH candidates in terms of time-frequency resources within the CORSET(s), and corresponding PDCCH candidate (SS) indexing where an indexing order and one unique index value for each PDCCH candidate (that maps to a time-frequency resource), etc. Based on this information, the UE can determine a set of PDCCH candidates, their PHY resource locations and their corresponding different SS index values. Typically, this is done using signaling transmitted in advance, or these parameters/configurations may be predefined, semi-statically (such as) configured, or some combination of predefinition, configuration and signaling may be used. For example, a UE may be (e.g., RRC) configured with aggregation levels 4 and 8, having N1 and N2 PDCCH candidates respectively, thus the UE having a total of N (=N1+N2) PDCCH candidates. The configuration/parameters may, for example, configure the order that the UE is to conduct searching/blind detection. In a specific example, the UE may be configured to conduct searching/blind detection for the aggregation level 4 PDCCH candidates first, followed by searching/blind detection for the aggregation level 8 PDCCH candidates second, where the PDCCH candidate indexing is also configured in the order of SSs with AL of 4 first and then AL of 8. The configuration/parameters may specify how to do the blind detection; for example, it may configure and specify a scrambling sequence associated with the UE for use in conducting blind detection. For the remainder of this example, it is assumed that scrambling with the UE C-RNTI is employed (but in general it is not limited to this type of UE identity or single UE).

At 802, the UE performs blind detection for a first PDCCH candidate, to determine at 804 whether the first PDCCH candidate is scrambled with the UE identifier C-RNTI. The UE continues to perform blind detection for PDCCH candidates until it detects a first DCI scrambled with the UE C-RNTI. In the flowchart, it is assumed that the first DCI is in the jth PDCCH candidate among a set of N PDCCH candidates. As such, following blind detection of the jth PDCCH candidate at 806 and having determined the PDCCH candidate is scrambled by the UE C-RNTI at 808, the UE processes the first DCI at 810 and extracts the position information of the second DCI. For example, the DCI indication may indicate that the second DCI is in the mth PDCCH candidate, (where j<m<=N), where the UE has knowledge of where the time-frequency resource of the mth PDCCH candidate is located based on the predefinition or (RRC) configuration. At 812, 814 the UE can go directly to performing detection of the mth PDCCH candidate using the UE identifier, and then processing the second DCI at 816, without blindly searching the other PDCCH candidates. The number of PDCCH candidates that do not need to be searched is m−j−1, which is between 0 and N−2.

Note that the DL and UL DCIs can be transmitted by the BS in any two PDCCH candidates among the available PDCCH candidates of a monitoring occasion. The BS may make this determination, for example based on the scheduling conditions, but the assigned PDCCH candidates are not known to the UE before the PDCCH blind detection.

Figure 9:
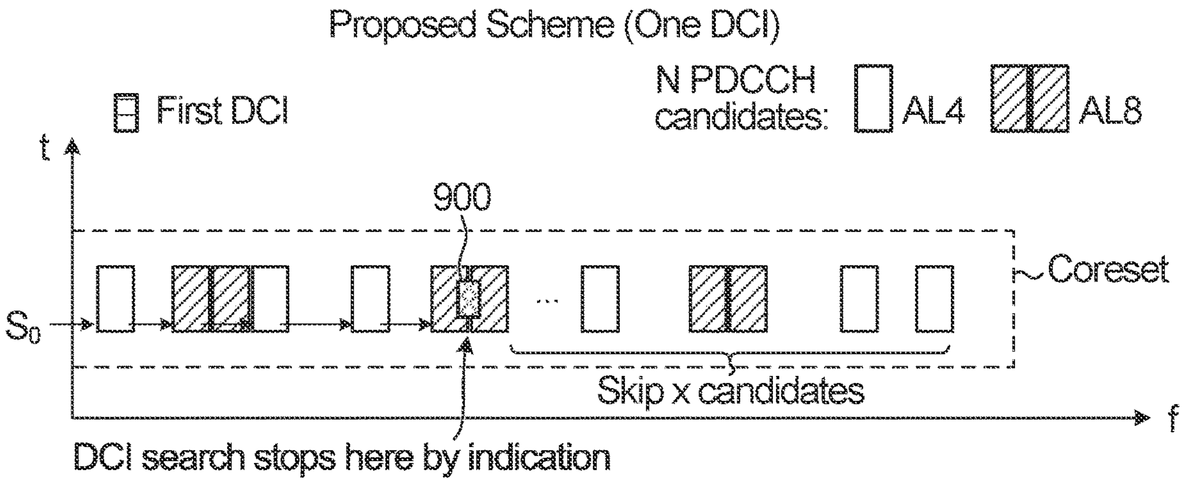

An example of a PDCCH enhanced blind detection procedure is shown in FIG. 9 for the situation in which only one DCI is transmitted by the base station to perform UL or DL scheduling, in one of the available UE PDCCH candidates of a monitoring occasion. In the example of FIG. 9, there is a single DCI 900 that includes an indication that there is no second DCI. Once the first DCI 900 is detected, the UE can learn from the indication in the first DCI that there is no second DCI present in this monitoring occasion. The UE can then stop any further blind detection after the detection of the first DCI. The UE can skip remaining PDCCH candidates. The savings in terms of the number of PDCCH candidates that do not need to be searched ranges from 0 to N−1, depending on the location of the first DCI.

Figure 10:
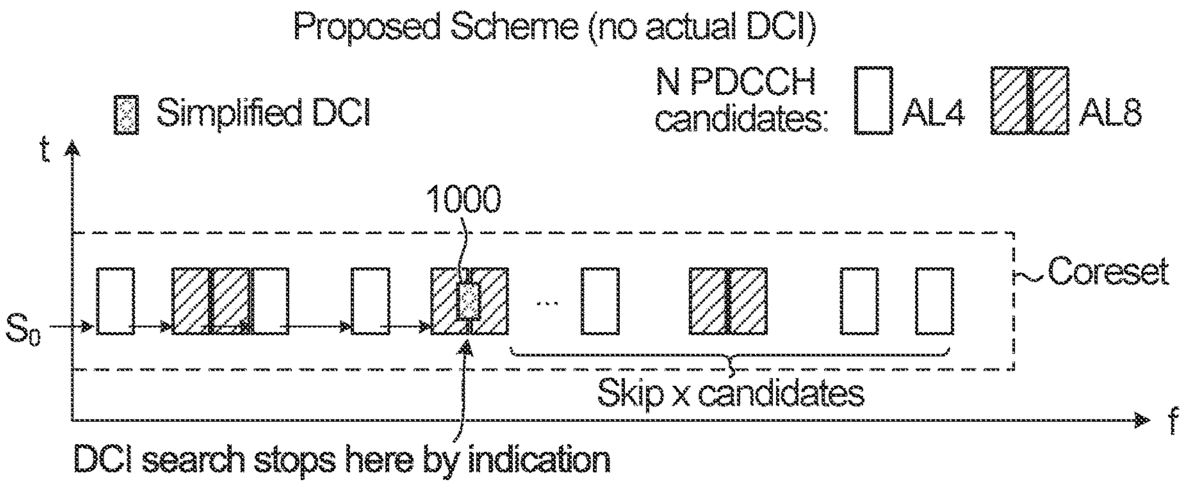

An example of a PDCCH enhanced blind detection procedure is shown in FIG. 10 for a case where there is no DCI for UL or DL scheduling in the PDCCH monitoring occasion. In this example, a single simplified DCI 1000 as described in previous paragraphs is transmitted in one of the available PDCCH candidates for the UE (or a group of UEs). The simplified DCI includes no scheduling information, and includes an indication that there is no DCI for UL or DL scheduling in that PDCCH monitoring occasion. This indication functions as an indication to stop searching early.

Once the simplified DCI is detected, the UE can learn from the indication in the DCI that there is no actual DCI for UL or DL scheduling in this PDCCH monitoring occasion. Following this, the UE will stop any further blind detection, so the UE can skip some number x of PDCCH candidates, where x takes values between 0 and N−1. Note that as described in previous paragraphs, this simplified DCI can be located in a fixed PDCCH candidate, such as the first PDCCH candidate that the UE is expected to search, or can be located in any PDCCH candidate selected by the BS. Such a simplified DCI including an indication with special bit values to stop searching early can be applicable to a UE or a group of UEs, for example, depending on the UE specific or group based scrambling sequence used. Note that in this case, additional or special DCI is required that could be applicable to one or more UEs, and there is a trade-off between additional network resource for the simplified DCI and the blind detection saving here.

Figure 11:
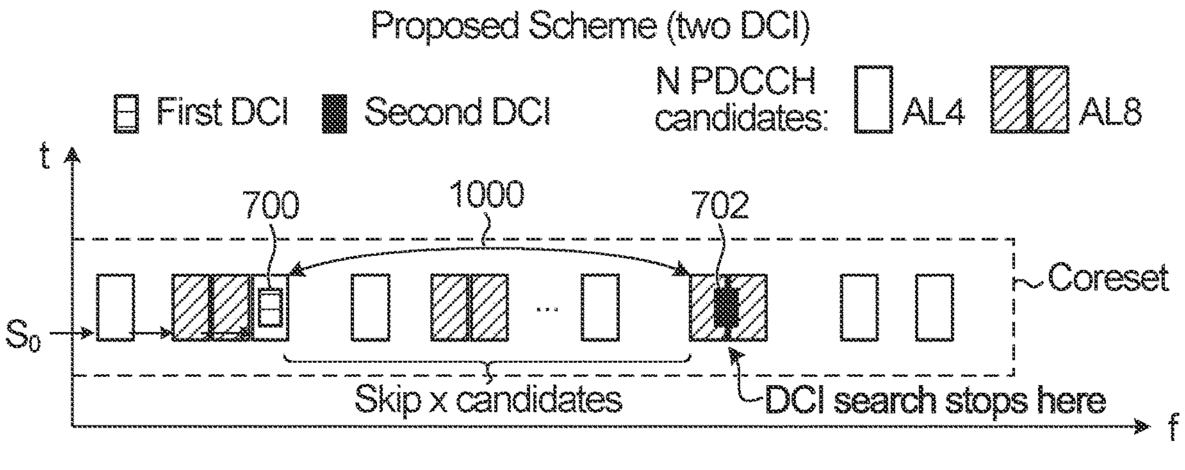

As described above, in some embodiments, each of the two DCIs for the UE may include the position information of the other DCI (mutual PDCCH candidate indication). Note that the first DCI can be either a DL DCI or an UL DCI, and the second DCI can be either an UL DCI or a DL DCI. An example of a PDCCH enhanced blind detection procedure based on this embodiment is shown in FIG. 11. FIG. 11 is the same as FIG. 7, except both the first DCI 700 and the second DCI 702 includes position information of the other DCI. This is represented by bidirectional arrow 1100.

In this example, once the first DCI message is detected, the UE can find in a first DCI 700 the DCI indication which indicates the PDCCH candidate that is used to carry the second DCI 702 message, so it can skip candidates and directly go the indicated PDCCH candidate to detect the second DCI 702 message. The second DCI 702 also includes the DCI indication which indicates the PDCCH candidate that is used to carry the first DCI 700 message. The mutual indication may provide additional reliability in case one of the two DCIs were mis-detected or falsely detected, thus enhancing reliability of the control messages, which can be beneficial to high reliability applications such a ultra reliable low latency (URLLC) services. Note that, for example, the first DCI can be falsely detected where the detected DCI is not a true DCI for the UE, and thus an indication to the PDCCH candidate location for the second DCI is not correct; in this case, the UE is not able to correctly detect the second DCI this way due to the false detection of the first DCI, thus the UE may be aware of this false alarm detection once it happens, so the UE may fall back to full blind detection over each possible PDCCH candidate configured.

For a DCI field a first DCI to carry the position information in terms of whether a second DCI is present in the PDCCH monitoring occasion, and if present, where is the location of the second DCI, one or more additional bits are added to the DCI field to carry that position information. The DCI field including the position information can be a modified version of an existing DCI field, or/and one or more newly defined DCI field(s). In one example, a bit-mapping is used to indicate which PDCCH candidate is used for the other DCI, so if N PDCCH candidates are configured, N bits are required for this approach.

To make more efficient usage of time and frequency resource in a DCI, the logical indices among N configured PDCCH candidates can be configured or pre-defined (for example in a table or a list). A DCI indication of n+1 bits can be used to indicate one of the N PDCCH candidates, where 1 bit is used to indicate whether or not there is a second DCI, and n bits are used to indicate the location of the second DCI as among the N PDCCH candidates.

Note that different UE may be configured with different aggregation levels and different number of PDCCH candidates per aggregation level, so different UE may have a different total number (N) of PDCCH candidates used in a CORESET. In this sense, the bit length used for such DCI functionality may be different, thus varying dependent on UE specific PDCCH DCI configuration. Alternatively, N can be considered a maximum number of available PDCCH candidates, No, over all possible ALs and maximum # of PDCCH candidates per AL for any UE. In this case, a fixed bit (and maximum) length in the DCI can be applied for one DCI to indicate if other DCI is present and (if present) the location of other DCI in a PDCCH monitoring occasion for each UE, where one bit is used to indicate if the second DCI is present or not, and no bits are used for the DCI location indication.

In some embodiments, the position information of the second DCI is in the form of an index or a value indicating a number of PDCCHs to skip.

In some embodiments, the position information of the second DCI is in the form of an index or a value indicating an index number for a specific PDCCH candidate where the second DCI is located.

In some embodiments, the position information of the second DCI is in the form of an index or a value indicating a mapping to which RBs and/or which symbols in a slot.

In some embodiments, the position information of the second DCI is in the form of an index or a value indicating a number of CORESET resources.

In some embodiments, the position information of the second DCI is in the form of an index or a value explicitly indicating a time frequency resource of the second PDCCH.

In some embodiments, the position information of the second DCI is in the form of an index or a value indicating there is no second DCI.

In some embodiments, a separate bit or bits are provided to indicate whether or not there is a second DCI.

Table 1 below is a specific example of position information.

TABLE 1

Indication of the second DCI if present and in which PDCCH candidate in the first DCI field(s), Option 1

| Field (Item) | Bits | Explanation |
|---|---|---|
| The other DCI Identifier (present or not; location) | 1 + n | • One bit to indicate whether the second DCI is present. For example:<br>One bit is the first bit<br>The one bit = 0 means no second DCI is present<br>The one bit = 1 means there is a second DCI<br>• An RRC configured value N > 1 indicates a total number of PDCCH candidates;<br>• PDCCH candidate indexing from 0~N − 1; PDCCH candidate indexing is RRC configured or predefined (to be associated with AL and which candidate in that AL) that maps to a PHY time-frequency resource.<br>• A value x of the n bits indicates a PDCCH candidate with an index value of x where the PDCCH candidate is used to carry the second DCI if present.<br>• Note that in the BS, a scheduler will schedule the first DCI that is carried in a PDCCH candidate with an index value (y), where y < x. The first DCI will be blindly (and sequentially) detected by the UE. |

Table 2 below is another specific example of position information.

TABLE 2

| Indication of the second DCI if present and in which PDCCH candidate in the first DCI field(s), Option 2 | | |
|---|---|---|
| Field (Item) | Bits | Explanation |
| If the other DCI is present or not | 1 | • One bit is used to indicate whether the second DCI is present. For example:<br>One bit is the first bit<br>The one bit = 0 means no second DCI is present<br>The one bit = 1 means there is a second DCI |
| The other DCI location indication among a set of PDCCH candidates | n | • A RRC configured value of N > 1 indicates a total number of PDCCH candidates;<br>• PDCCH candidate indexing from 0~N − 1; candidate indexing is RRC configured or predefined (to be associated with AL and which candidate in that AL) that maps to a PHY time-frequency resource.<br>• A value x of the n bits indicates a PDCCH candidate with an index value of x where the PDCCH candidate is used to carry the second DCI if present.<br>• Note that in the BS, a scheduler will schedule the first DCI that is carried in a PDCCH candidate with an index value (y), where y < x. The first DCI will be blindly (and sequentially) detected by the UE. |

Table 3 below is another specific example of position information.

TABLE 3

| Indication of the second DCI if present and in which PDCCH candidate in the first DCI field(s), Option 3 | | |
|---|---|---|
| Field (Item) | Bits | Explanation |
| The other DCI Identifier (present or not; location) | 1 + N | • One bit is used to indicate whether the second DCI is present. For example:<br>One bit is the first bit<br>The one bit = 0 means no second DCI is present<br>The one bit = 1 means there is a second DCI<br>• A value of N > 1 is RRC configured, which is the total number of N PDCCH candidates, and PDCCH candidate indexing from 0~N − 1, each candidate indexing is RRC configured or predefined (to be associated with AL and which candidate in that AL) that maps to a PHY time-frequency resource.<br>• For a total of N PDCCH candidates, N bits are used, with one bit associated with each PDCCH candidate. For example, starting 0 from the left-most bit to right-most bit (N − 1), one bit setting to "1" to indicate a corresponding PDCCH candidate index value (x), e.g., N = 7, "0000100" indicates the PDCCH candidate with index value of 4.<br>• Note that in the BS, a scheduler will schedule the first DCI that is carried in a PDCCH candidate with an index value (y), where y < x. The first DCI will be blindly (and sequentially) detected by the UE. |

Table 4 below is another specific example of a DCI indication.

TABLE 4

| Indication of the second DCI if present and in which PDCCH candidate in the first DCI field(s), Option 4 | | |
|---|---|---|
| Field (Item) | Bits | Explanation |
| If the other DCI is present or not | 1 | • One bit is used to indicate whether the second DCI is present. For example: |

TABLE 4-continued

| Indication of the second DCI if present and in which PDCCH candidate in the first DCI field(s), Option 4 | | |
|---|---|---|
| Field (Item) | Bits | Explanation |
| The other DCI location indication among a set of PDCCH candidates | N | One bit is the first bit<br>The one bit = 0 means no second DCI is present<br>The one bit = 1 means there is a second DCI<br>• A value of N > 1 is RRC configured, which is the total of N PDCCH candidates, and PDCCH candidate indexing from 0~N − 1, each candidate indexing is RRC configured or predefined (to be associated with AL and which candidate in that AL) that maps to a PHY time-frequency resource.<br>• For a total of N PDCCH candidates, N bits are used, with one bit<br>associated with each PDCCH candidate. For example, starting 0 from the left-most bit to right-most bit (N − 1), one bit setting to "1" to indicate a corresponding PDCCH candidate index value (x), e.g., N = 7, "0000100" indicates the PDCCH candidate with index value of 4.<br>• Note that in the BS, a scheduler will schedule the first DCI that is carried in a PDCCH candidate with an index value (y), where y < x. The first DCI will be blindly (and sequentially) detected by the UE. |

Table 5 below is another specific example of a DCI indication where the DCI indication is used to indicate relative (skipped candidate) location of second DCI

TABLE 5

| DCI indication used to indicate relative location of second DCI | | |
|---|---|---|
| Field (Item) | Bits | Explanation |
| The other DCI Identifier (present or not; location) | n | • If all n 0's, meaning no second DCI;<br>• If non-zero value j, skip $2^j$ candidates to find and detect the second DCI |

A specific example of the Table 5 approach is given in Table 6 below.

TABLE 6

| Specific example of DCI indication used to indicate relative location of second DCI | |
|---|---|
| Index | |
| 0 | No second DCI is present |
| 1 | Skip 2 PDCCHs |
| 2 | Skip 4 PDCCHs |
| . . . | |
| j | Skip $2^j$ PDCCHs |

Numerous modifications and variations of the present disclosure are possible in light of the above teachings. It is therefore to be understood that within the scope of the appended claims, the disclosure may be practiced otherwise than as specifically described herein.

The invention claimed is:

1. A method in an apparatus, the method comprising:

receiving, by the apparatus, a signaling of a configuration of physical downlink control channel (PDCCH) monitoring by the apparatus;

receiving, by the apparatus, a first downlink control information (DCI) in a first PDCCH, the first DCI comprising at least one field indicating presence information of a second DCI in a second PDCCH, wherein receiving, by the apparatus, the first DCI in the first PDCCH comprises monitoring at least one PDCCH candidate within a set of PDCCH candidates to decode a PDCCH candidate scrambled with an identifier associated with the apparatus, wherein the identifier associated with the apparatus is the apparatus identifier or a group identifier, wherein the set of PDCCH candidates have candidate indices that are pre-defined or radio resource control (RRC) configured, and wherein the candidate indices are mapped to time-frequency resource areas; and decoding, by the apparatus, the second DCI in the second PDCCH.

2. The method of claim 1 wherein the signaling of a configuration of PDCCH monitoring comprises one or more of semi-static signaling, dynamic signaling, medium access control (MAC) control entity (CE), radio resource control (RRC) signaling, or layer 1 (L1) signaling.

3. The method of claim 1, wherein the signaling of a configuration of PDCCH monitoring comprises parameters of at least one or more of control resource set (CORESET), PDCCH candidates, search space (SS), PDCCH candidate indexing, PDCCH candidate time-frequency resources, or PDCCH search ordering.

4. The method of claim 1 wherein the first PDCCH and the second PDCCH are among a set of PDCCH candidates or search spaces, wherein at least one PDCCH candidate or search space of the set of PDCCH candidates or search spaces is used for carrying at least one of the first DCI or the second DCI.

5. The method of claim 1 wherein the presence information of the second DCI in the second PDCCH comprises at least one of the following:

an index or a value indicating a subset of resource from resource blocks in a CORESET;

an index or a value indicating a number among configured CORESET resources;

an index or value indicating a relative position of the second PDCCH candidate relative to the first PDCCH;

an index or value indicating an absolute position of the second PDCCH as among a set of possible PDCCH candidates;

an index or a value indicating an index number among a set of PDCCH candidates;
an index or a value indicating a time-frequency resource area;
an index or a value indicating partial or all CORESET resources;
an index or a value indicating there is no second DCI; or
a bitmap including one bit for each PDCCH candidate.

6. The method of claim 1 wherein:
the at least one field is a modification of at least one existing field; or
the at least one field is at least one new field; or
the at least one field is a combination of at least one field that is a modification of at least one existing field and one or more new field(s).

7. The method of claim 1, wherein the presence information of the second DCI in the second PDCCH comprises an n-bit index defining one or more of the following:
all n bits are 0: there is no second DCI;
the n bits represent a non-zero value j: skip $\mathbf{2}^j$ PDCCH candidates to find and detect the second DCI.

8. An apparatus comprising:
at least one processor coupled with a memory storing processor-executable instructions that, when executed, cause the at least one processor to:
receive a signaling of a configuration of physical downlink control channel (PDCCH) monitoring by the apparatus;
receive a first downlink control information (DCI) in a first PDCCH, the first DCI comprising at least one field indicating presence information of a second DCI in a second PDCCH, wherein receiving, by the apparatus, the first DCI in the first PDCCH comprises monitoring at least one PDCCH candidate within a set of PDCCH candidates to find a PDCCH candidate scrambled with an identifier associated with the apparatus, wherein the identifier associated with the apparatus is a user equipment (UE) identifier or a group identifier, and wherein the set of PDCCH candidates have candidate indices that are pre-defined or radio resource control (RRC) configured, where the candidate indices are mapped to time-frequency resource areas; and
decode the second DCI in the second PDCCH.

9. The apparatus of claim 8 wherein the signaling of a configuration of PDCCH monitoring comprises one or more of semi-static signaling, dynamic signaling, medium access control (MAC) control entity (CE), radio resource control (RRC) signaling, or layer 1 (L1) signaling.

10. The apparatus of claim 8 wherein the signaling of a configuration of PDCCH monitoring comprises parameters of at least one or more of control resource set (CORESET), PDCCH candidates, search space (SS), PDCCH candidate indexing, PDCCH candidate time-frequency resources, or PDCCH search ordering.

11. The apparatus of claim 8 wherein the first PDCCH and the second PDCCH are among a set of PDCCH candidates or search spaces, wherein at least one PDCCH candidate or search space of the set of PDCCH candidates or search spaces is used for carrying at least one of the first DCI or the second DCI.

12. The apparatus of claim 8 wherein the presence information of the second DCI in the second PDCCH comprises at least one of the following:
an index or a value indicating a subset of resource from resource blocks in a CORESET;
an index or a value indicating a number among configured CORESET resources;
an index or value indicating a relative position of the second PDCCH candidate relative to the first PDCCH;
an index or value indicating an absolute position of the second PDCCH as among a set of possible PDCCH candidates;
an index or a value indicating an index number among a set of PDCCH candidates;
an index or a value indicating a time-frequency resource area;
an index or a value indicating partial or all CORESET resources;
an index or a value indicating there is no second DCI; or
a bitmap including one bit for each PDCCH candidate.

13. The apparatus of claim 8 wherein:
the at least one field is a modification of at least one existing field; or
the at least one field is at least one new field; or
the at least one field is a combination of at least one field that is a modification of at least one existing field and one or more new field(s).

14. The apparatus of claim 8, wherein the presence information of the second DCI in the second PDCCH comprises an n-bit index defining one or more of the following:
all n bits are 0: there is no second DCI;
the n bits represent a non-zero value j: skip $2^j$ PDCCH candidates to find and detect the second DCI.

15. A network device comprising:
at least one processor coupled with a memory storing processor-executable instructions that, when executed, cause the at least one processor to:
transmit a signaling of a configuration of physical downlink control channel (PDCCH) monitoring;
transmit a first downlink control information (DCI) in a first PDCCH, wherein transmitting the first DCI in the first PDCCH comprises transmitting the first DCI in a PDCCH candidate within a set of PDCCH candidates, the PDCCH candidate scrambled with an identifier associated with an apparatus, wherein the identifier associated with the apparatus is the apparatus identifier or a group identifier, and wherein the set of PDCCH candidates have candidate indices that are pre-defined or radio resource control (RRC) configured, where the candidate indices are mapped to time-frequency resource areas;
wherein the first DCI comprises at least one field indicating presence information of a second DCI in a second PDCCH.

16. The network device of claim 15 wherein the signaling of a configuration of PDCCH monitoring comprises one or more of semi-static signaling, dynamic signaling, medium access control (MAC) control entity (CE), radio resource control (RRC) signaling, or layer 1 (L1) signaling.

17. The network device of claim 15 wherein the signaling of a configuration of PDCCH monitoring comprises parameters of at least one or more of control resource set (CORESET), PDCCH candidates, search space (SS), PDCCH candidate indexing, PDCCH candidate time-frequency resources, or PDCCH search ordering.

18. The network device of claim 15 wherein the presence information of the second DCI in the second PDCCH comprises at least one of the following:
an index or a value indicating a subset of resource from resource blocks in a CORESET;
an index or a value indicating a number among configured CORESET resources;

an index or value indicating a relative presence of the second PDCCH candidate relative to the first PDCCH;

an index or value indicating an absolute presence of the second PDCCH as among a set of possible PDCCH candidates;

an index or a value indicating an index number among a set of PDCCH candidates;

an index or a value indicating a time-frequency resource area;

an index or a value indicating partial or all CORESET resources;

an index or a value indicating there is no second DCI; or a bitmap including one bit for each PDCCH candidate.

19. The network device of claim 15, wherein:

the at least one field is a modification of at least one existing field;

the at least one field is at least one new field; or the at least one field is a combination of at least one field that is a modification of at least one existing field and one or more new field(s).

20. The network device of claim 15, wherein the presence information of the second DCI in the second PDCCH comprises an n-bit index defining one or more of the following:

all n bits are 0: there is no second DCI;

the n bits represent a non-zero value j: skip $2^j$ PDCCH candidates to find and detect the second DCI.

* * * * *